(12) United States Patent
Nakagomi et al.

(10) Patent No.: US 9,563,111 B2
(45) Date of Patent: Feb. 7, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Yoichi Nakagomi, Matsumoto (JP); Junichi Suzuki, Matsumoto (JP); Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 264 days.

(21) Appl. No.: 14/507,196

(22) Filed: Oct. 6, 2014

(65) Prior Publication Data

US 2015/0103324 A1   Apr. 16, 2015

(30) Foreign Application Priority Data

Oct. 11, 2013 (JP) .................. 2013-213472
Mar. 10, 2014 (JP) .................. 2014-045994
(Continued)

(51) Int. Cl.
| H05B 37/02 | (2006.01) |
| G03B 21/20 | (2006.01) |
| H05B 41/288 | (2006.01) |

(52) U.S. Cl.
CPC ....... *G03B 21/2053* (2013.01); *G03B 21/2026* (2013.01); *H05B 41/2887* (2013.01); *H05B 41/2888* (2013.01); *Y02B 20/202* (2013.01)

(58) Field of Classification Search
CPC ........ H05B 41/16; H05B 41/28; H05B 41/382
(Continued)

(56) References Cited

U.S. PATENT DOCUMENTS 6,867,556 B2   3/2005  Arimoto et al.
6,958,580 B2   10/2005 Kamoi et al.
(Continued)

FOREIGN PATENT DOCUMENTS

CN   101336037 A   12/2008
CN   103327713 A    9/2013
(Continued)

OTHER PUBLICATIONS

U.S. Appl. No. 14/506,087, filed Oct. 3, 2014 in the name of Nakagomi et al.

*Primary Examiner* — Thuy Vinh Tran
(74) *Attorney, Agent, or Firm* — Oliff PLC

(57) ABSTRACT

A discharge lamp driving device includes: a discharge lamp driving unit which supplies drive power to a discharge lamp having electrodes; a storage unit which stores information with respect to the discharge lamp; and a control unit which controls the discharge lamp driving unit, wherein the control unit is configured to execute a stationary lighting driving in which first drive power is supplied to the discharge lamp and a high-power driving in which second drive power that is higher than the first drive power is supplied to the discharge lamp, and the control unit sets first execution information of the high-power driving on the basis of first information with respect to the high-power driving stored in the storage unit, at a predetermining setting timing, and controls the discharge lamp driving unit according to the first execution information.

20 Claims, 21 Drawing Sheets

(30) Foreign Application Priority Data

Mar. 11, 2014 (JP) .................................. 2014-047298
Jul. 24, 2014 (JP) .................................. 2014-150863

(58) Field of Classification Search
USPC ....... 315/224, 225, 226, 291, 307, 308, 309, 315/360
See application file for complete search history.

(56) References Cited

U.S. PATENT DOCUMENTS

| | | | |
|---|---|---|---|
| 6,979,960 B2 | 12/2005 | Okawa et al. | |
| 7,439,691 B2 | 10/2008 | Sugaya et al. | |
| 7,946,715 B2* | 5/2011 | Yamauchi | H05B 41/2928 315/246 |
| 8,018,178 B2* | 9/2011 | Yamauchi | H05B 41/2928 315/209 R |
| 8,269,426 B2* | 9/2012 | Yamauchi | H05B 41/2928 315/209 R |
| 2008/0315790 A1 | 12/2008 | Ikeda et al. | |
| 2010/0244741 A1* | 9/2010 | Fukuda | H05B 41/2928 315/307 |
| 2013/0250254 A1 | 9/2013 | Saito et al. | |
| 2015/0271901 A1 | 9/2015 | Saito et al. | |

FOREIGN PATENT DOCUMENTS

| | | |
|---|---|---|
| JP | A-5-82271 | 4/1993 |
| JP | A-9-17590 | 1/1997 |
| JP | 2003-223997 A | 8/2003 |
| JP | A-2003-295320 | 10/2003 |
| JP | A-2004-134162 | 4/2004 |
| JP | A-2004-342465 | 12/2004 |
| JP | A-2008-41588 | 2/2008 |
| JP | A-2008-270058 | 11/2008 |
| JP | A-2009-76419 | 4/2009 |
| JP | B2-4400125 | 1/2010 |
| JP | 2010-113822 A | 5/2010 |
| JP | B2-4972992 | 7/2012 |

\* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a projector, and a discharge lamp driving method.

2. Related Art

Recently, energy savings are desired in projectors. Therefore, projectors equipped with various lighting modes are provided, such as a low-power mode in which drive power to a lamp is lower than usual, a dimming mode in which drive power is changed synchronously with video signals, and a standby mode in which drive power is lowered when video signals are not inputted from outside. For example, in the low-power mode, since lower drive power is supplied to the lamp, a load on electrodes is lower, thus increasing the service life of the lamp.

However, if drive power is lower than rated power, protrusions at distal ends of the electrodes cannot be melted sufficiently. As the lighting is continued for a long time, the protrusions get worn and reduced. The reduction of the protrusions means the expansion of the distance between the electrodes, causing a fall in illuminance. That is, if the shape of the protrusions at the distal ends of the electrodes cannot be maintained, the advantages of the low-power mode cannot be achieved and a problem of shorter service life of the lamp arises. Thus, in order to overcome this problem, a discharge lamp lighting device and a projector in which the lamp is driven in a refresh lighting mode to facilitate the melting of the protrusions of the electrodes during a predetermined period after the lighting of the lamp are proposed (see JP-A-2008-270058).

In the projector of JP-A-2008-270058, lamp power above a rated power value is supplied in the refresh lighting mode. In this case, it is anticipated that the protrusions formed in normal lighting are melted excessively and cannot be maintained in shape. Consequently, the lamp flickers as the lamp cannot maintain stable discharge. Also, a high load is on an arc tube and may cause inconvenience such as crystallization of the quartz glass or so-called, devitrification.

SUMMARY

An advantage of some aspects of the invention is to provide a discharge lamp driving device, a light source, a projector and a discharge lamp driving method that can maintain stable discharge.

An aspect of the invention is directed to a discharge lamp driving device including: a discharge lamp driving unit which supplies drive power to a discharge lamp having electrodes; a storage unit which stores information with respect to the discharge lamp; and a control unit which controls the discharge lamp driving unit. The control unit is configured to execute a stationary lighting driving in which first drive power is supplied to the discharge lamp and a high-power driving in which second drive power that is higher than the first drive power is supplied to the discharge lamp. The control unit sets first execution information of the high-power driving on the basis of first information with respect to the high-power driving stored in the storage unit, at a predetermining setting timing, and controls the discharge lamp driving unit according to the first execution information.

In the discharge lamp driving device according to this aspect of the invention, the first execution information of the high-power driving is set on the basis of the first information with respect to the high-power driving stored in the storage unit. Therefore, the magnitude of a heat load applied to protrusions at distal ends of the electrodes at the time of the high-power driving can be adjusted according to the state of the protrusions. Thus, according to this discharge lamp driving device, excessive melting of the protrusions can be retained and the discharge of the discharge lamp can be maintained stably.

The first information may include a lighting time of the discharge lamp within a period from an end of previous high-power driving to the setting timing.

According to this configuration, the first execution information of the high-power driving can be set according to the degree of growth of the protrusions at the distal ends of the electrodes.

The first information may include an inter-electrode voltage of the discharge lamp detected at the time of the high-power driving.

According to this configuration, the first execution information of the high-power driving can be set according to the degree of deterioration of the discharge lamp.

The first information may include a value of the second drive power supplied to the discharge lamp at the time of the high-power driving.

According to this configuration, the first execution information of the subsequent high-power driving can be set according to the degree of melting of the protrusions at the distal ends of the electrodes at the time of the high-power driving.

The first information may include a waveform of a drive current in the high-power driving.

According to this configuration, the first execution information of the subsequent high-power driving can be set according to the degree of melting of the protrusions at the distal ends of the electrodes at the time of the high-power driving.

The control unit may set the first execution information on the basis of second information with respect to a lighting state of the discharge lamp at the setting timing.

According to this configuration, since the first execution information of the high-power driving can be set on the basis of the first information with respect to the high-power driving and the second information with respect to the lighting state of the discharge lamp at the setting timing, the high-power driving can be executed more appropriately.

The second information may include an inter-electrode voltage of the discharge lamp detected at the setting timing.

According to this configuration, the first execution information of the high-power driving can be set according to the degree of deterioration of the discharge lamp.

A launching period, from a start of lighting of the discharge lamp to a shift to a stationary lighting period in which the stationary lighting driving is carried out, may include a first launching period in which the drive power increases and a second launching period in which the drive power is maintained at a constant value. The setting timing may be set to an arbitrary time point in the first launching period. Based on the inter-electrode voltage of the discharge lamp detected at the setting timing, the inter-electrode voltage in the stationary lighting period may be estimated.

According to this configuration, since the inter-electrode voltage in the first launching period is referred to every time the discharge lamp is lit, the inter-electrode voltage at the time of the stationary lighting driving can be estimated precisely and the degree of deterioration of the discharge lamp can be detected accurately.

The second information may include a cumulative lighting time of the discharge lamp at the setting timing.

According to this configuration, the first execution information of the high-power driving can be set according to the degree of deterioration of the discharge lamp.

The control unit may set the first execution information on the basis of third information with respect to driving of the discharge lamp executed within a period from an end of previous high-power driving to the setting timing.

According to this configuration, the first execution information of the high-power driving can be set more appropriately according to the degree of growth of the protrusions at the distal ends of the electrodes.

The third information may include a value of the drive power supplied to the discharge lamp.

According to this configuration, the first execution information of the high-power driving can be set more appropriately according to the degree of growth of the protrusions at the distal ends of the electrodes.

The third information may include an inter-electrode voltage of the discharge lamp at the time of previous lighting of the discharge lamp.

According to this configuration, the degree of deterioration of the discharge lamp can be detected more accurately.

A launching period, from a start of lighting of the discharge lamp to a shift to a stationary lighting period in which the stationary lighting driving is carried out, may include a first launching period in which the drive power increases and a second launching period in which the drive power is maintained at a constant value. The setting timing may be set to an arbitrary time point in the first launching period. Based on the inter-electrode voltage of the discharge lamp detected at the time of previous lighting of the discharge lamp, the inter-electrode voltage in the stationary lighting period may be estimated.

According to this configuration, since the inter-electrode voltage that is already stored at the time of previous lighting is referred to at the time of next lighting, the inter-electrode voltage at the time of the stationary lighting driving can be estimated easily and the degree of deterioration of the discharge lamp can be detected accurately.

The first execution information may include a restraining time in which execution of the high-power driving is restrained.

According to this configuration, the execution of the high-power driving can be restrained appropriately according to the degree of growth of the protrusions at the distal ends of the electrodes.

The first execution information may include whether to execute the high-power driving or not.

According to this configuration, execution of next high-power driving is restrained until the protrusions at the distal ends of the electrodes grow sufficiently after the execution of the high-power driving.

The first execution information may include a drive parameter of the high-power driving.

According to this configuration, the drive parameter of next high-power driving can be set appropriately according to the degree of growth of the protrusions at the distal ends of the electrodes after the execution of the high-power driving.

The drive parameter may include a value of the second drive power in the high-power driving.

According to this configuration, excessive melting of the protrusions at the distal ends of the electrodes can be restrained by controlling the second drive power in the high-power driving.

The drive parameter may include a waveform of a drive current supplied to the discharge lamp in the high-power driving.

According to this configuration, excessive melting of the protrusions at the distal ends of the electrodes can be restrained by controlling the drive current waveform in the high-power driving.

The drive parameter may include an execution time of the high-power driving.

According to this configuration, excessive melting of the protrusions at the distal ends of the electrodes can be restrained by controlling the execution time of the high-power driving.

The control unit may control the discharge lamp driving unit to execute the high-power driving in a launching period from a start of lighting of the discharge lamp to a shift to a stationary lighting period in which the stationary lighting driving is carried out.

According to this configuration, flickering of the discharge lamp can be restrained when the high-power driving is carried out.

The launching period may include a first launching period in which the drive power increases and a second launching period in which the drive power is maintained at a constant value. In the first launching period, the drive power may increase toward the second drive power. In the second launching period, the drive power may be maintained at the value of the second drive power. The control unit may control the discharge lamp driving unit to execute the high-power driving in the second launching period.

According to this configuration, the protrusions at the distal ends of the electrodes can be melted appropriately and the shape of the protrusions can be maintained.

The control unit may control the discharge lamp driving unit to execute the high-power driving in a stationary lighting period in which the stationary lighting driving is carried out.

According to this configuration, the lighting state of the discharge lamp can be grasped easily and the first execution information of the high-power driving can be set more appropriately.

The second drive power may be set to be higher as the inter-electrode voltage of the discharge lamp increases.

According to this configuration, the second drive power is set to be relatively low for the discharge lamp that is not deteriorated, whereas the second drive power is set to be relatively high for the discharge lamp in which deterioration is advanced. Thus, excessive melting of the protrusions at the distal ends of the electrodes of the discharge lamp can be restrained and the shape of the protrusions can be maintained.

The control unit may be configured to execute a protrusion forming driving to facilitate growth of the protrusions formed at the distal ends of the electrodes, and may execute the protrusion forming driving after executing the high-power driving and before executing the stationary lighting driving.

According to this configuration, the protrusion forming driving to facilitate the growth of the protrusions at the distal ends of the electrodes of the discharge lamp is executed after the high-power driving is executed and before the stationary lighting driving is executed. Therefore, the protrusions that are flattened by the high-power driving are allowed to grow and sharpen by the protrusion forming driving. Thus, a shift to the stationary lighting driving in the state where the protrusions are in the flattened shape can be restrained. Consequently, flickering of the discharge lamp can be restrained.

A drive current in the protrusion forming driving may include an alternating current having a frequency equal to or higher than 100 Hz and equal to or lower than 1000 Hz.

According to this configuration, the growth of the protrusions at the distal ends of the electrodes can be facilitated in the protrusion forming driving.

A drive current in the high-power driving may include an alternating current having a frequency equal to or higher than 100 Hz and equal to or lower than 1000 Hz. A proportion of a time when the alternating current is supplied to an execution time of the protrusion forming driving may be higher than a proportion of a time when the alternating current is supplied to an execution time of the high-power driving.

According to this configuration, the growth of the protrusions at the distal ends of the electrodes can be facilitated further in the protrusion forming driving.

A drive current in the stationary lighting driving may include an alternating current having a frequency equal to or higher than 100 Hz and equal to or lower than 1000 Hz. A proportion of a time when the alternating current is supplied to an execution time of the protrusion forming driving may be higher than a proportion of a time when the alternating current is supplied to an execution time of the stationary lighting driving.

According to this configuration, expansion of the distance between the electrodes due to the thinning of the protrusions can be restrained.

The control unit may control the discharge lamp driving unit such that third drive power that is higher than the first drive power and lower than the second drive power is supplied to the discharge lamp in the protrusion forming driving.

According to this configuration, a sudden change in the drive power is restrained and the load applied to the discharge lamp is reduced.

The control unit may control the discharge lamp driving unit such that the drive power supplied to the discharge lamp continuously changes from the first drive power to the second drive power at least in a period in which the protrusion forming driving is executed.

According to this configuration, a sudden change in the drive power is restrained further and the load applied to the discharge lamp is reduced further.

The control unit may set second execution information of the protrusion forming driving on the basis of the first information.

According to this configuration, the protrusion forming driving can be controlled according to the degree of melting of the protrusions at the distal ends of the electrodes in the high-power driving. Therefore, flickering of the discharge lamp can be restrained further.

The control unit may set second execution information of the protrusion forming driving on the basis of deterioration information of the discharge lamp.

According to this configuration, the second execution information of the protrusion forming driving can be set appropriately according to the deterioration state of the discharge lamp.

The deterioration information may be an inter-electrode voltage of the discharge lamp.

According to this configuration, the deterioration state of the discharge lamp can be grasped.

The second execution information may include an execution time of the protrusion forming driving.

According to this configuration, execution of the stationary lighting driving in the state where the protrusions at the distal ends of the electrodes are flattened can be restrained.

A drive current in the protrusion forming driving may include an alternating current having a frequency equal to or higher than 100 Hz and equal to or lower than 1000 Hz. The second execution information may include a proportion of a time when the alternating current is supplied to an execution time of the protrusion forming driving.

According to this configuration, execution of the stationary lighting driving in the state where the protrusions at the distal ends of the electrodes are flattened can be restrained.

Another aspect of the invention is directed to a light source including: a discharge lamp which emits light; and the discharge lamp driving device described above.

Since the light source according to this aspect of the invention includes the above discharge lamp driving device, the discharge of the discharge lamp can be maintained stably.

Still another aspect of the invention is directed to a projector including: the light source described above; a light modulation element which modulates light emitted from the light source according to a video signal; and a projection system which projects the light modulated by the light modulation element.

Since the projector according to this aspect of the invention includes the above light source, the discharge of the discharge lamp can be maintained stably.

Yet another aspect of the invention is directed to a discharge lamp driving method including a stationary lighting driving in which first drive power is supplied to a discharge lamp having electrodes and a high-power driving in which second drive power that is higher than the first drive power is supplied to the discharge lamp. The method includes: setting first execution information of the high-power driving on the basis of first information with respect to the high-power driving, at a predetermined setting timing.

According to the discharge lamp driving method of this aspect, the discharge of the discharge lamp can be maintained stably, as in the foregoing description.

Also, according to the discharge lamp driving method of this aspect, excessive melting of protrusions at distal ends of electrodes can be restrained and expansion of the distance between the electrodes of the discharge lamp can be restrained, as in the foregoing description.

The driving method may include providing protrusion forming driving to facilitate growth of the protrusions formed at the distal ends of the electrodes. The protrusion forming driving may be executed after the high-power driving is executed and before the stationary lighting driving is executed.

According to this driving method, flickering of the discharge lamp can be restrained, as in the foregoing description.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
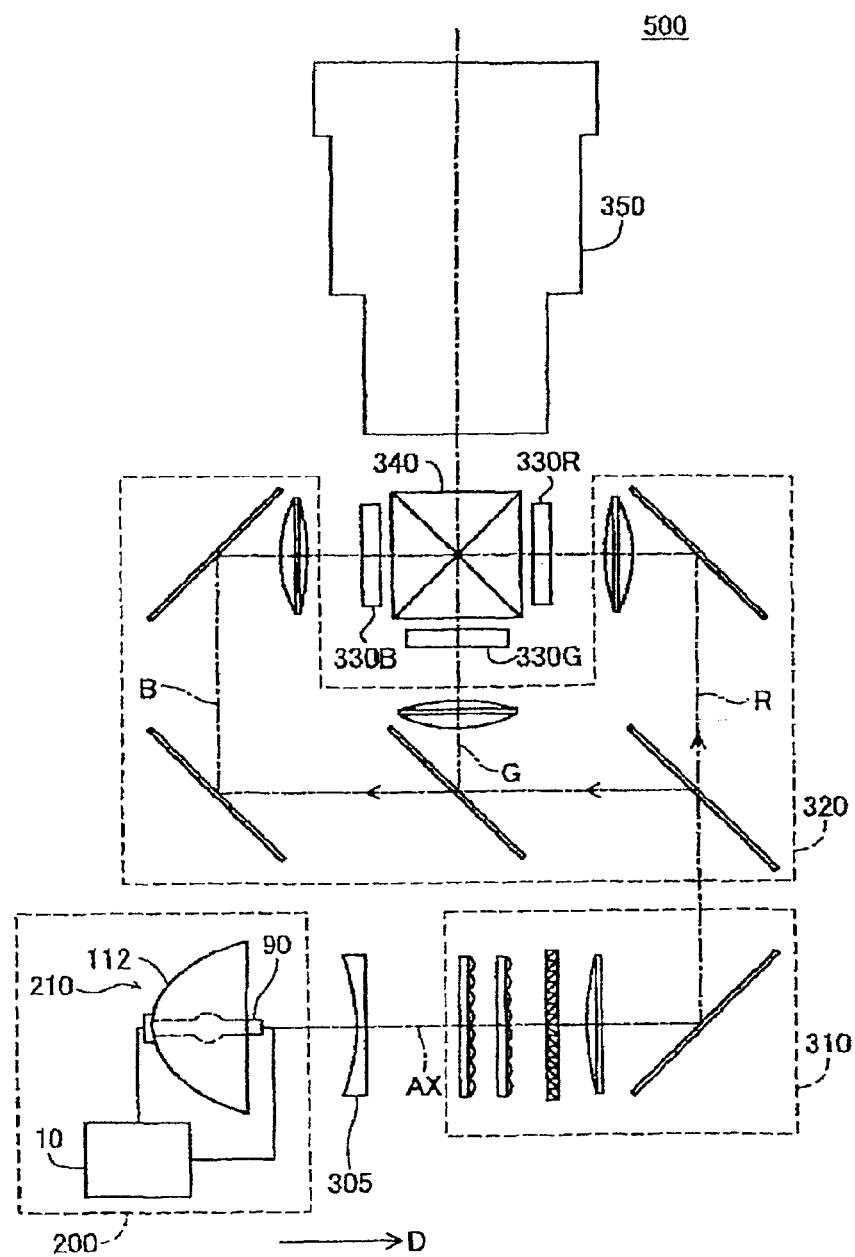
FIG. 1 shows the schematic configuration of a projector according to a first embodiment.

Hereinafter, a projector according to an embodiment of the invention will be described with reference to the drawings.

It should be noted that the scope of the invention is not limited to the embodiments below and that arbitrary changes can be made within the technical ideas of the invention. Also, in the drawings, the scale, number and the like of each structure may appear different from the actual structure, in order to facilitate understanding of each configuration.

First Embodiment

As shown in FIG. 1, a projector 500 according to this embodiment includes a light source 200, a parallelizing lens 305, an illumination system 310, a color separation system 320, three liquid crystal light valves 330R, 330G, 330B (light modulation elements), a cross dichroic prism 340, and a projection system 350.

The light emitted from the light source 200 passes through the parallelizing lens 305 and becomes incident on the illumination system 310. The parallelizing lens 305 has the function of parallelizing the light from the light source 200.

The illumination system 310 has the function of adjusting the illuminance of the light emitted from the light source 200 so that the illuminance becomes uniform on the liquid crystal light valves 330R, 330G, 330B. The illumination system 310 also has the function of aligning the polarizing direction of the light emitted from the light source 200 into one direction. The reason for this is to allow the light emitted from the light source 200 to be effectively utilized on the liquid crystal light valves 330R, 330G, 330B.

The light with the illuminance distribution and polarizing direction thus adjusted becomes incident on the color separation system 320. The color separation system 320 separates the incident light into three color lights of red light (R), green light (G), and blue light (B). The three color lights are modulated by the liquid crystal light valves 330R, 330G, 330B corresponding to the respective color lights. The liquid crystal light valves 330R, 330G, 330B have liquid crystal panels 560R, 560G, 560B, described later, and polarizers (not shown). The polarizers are arranged on the light incident side and light exiting side of each of the liquid crystal panels 560R, 560G, 560B.

The modulated three color lights are combined by the cross dichroic prism 340. The combined light becomes incident on the projection system 350. The projection system 350 projects the incident light onto a screen 700 (see FIG. 3). Thus, a video is displayed on the screen 700. Known configurations can be employed for each of the parallelizing lens 305, the illumination system 310, the color separation system 320, the cross dichroic prism 340 and the projection system 350.

Figure 2:
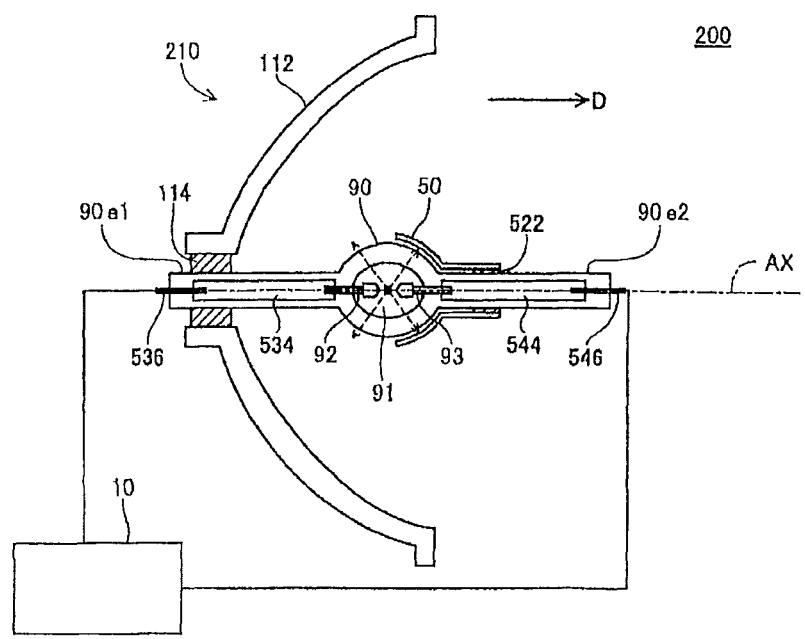
FIG. 2 is a cross-sectional view showing a discharge lamp of the first embodiment.

FIG. 2 is a cross-sectional view showing the configuration of the light source 200. The light source 200 includes a light source unit 210, and a discharge lamp lighting device (discharge lamp driving device) 10. FIG. 2 shows a cross-sectional view of the light source unit 210. The light source unit 210 has a main reflection mirror 112, a discharge lamp 90, and a sub reflection mirror 50.

The discharge lamp lighting device 10 supplies a drive current (drive power) to the discharge lamp 90 and thus lights the discharge lamp 90. The main reflection mirror 112 reflects the light radiated from the discharge lamp 90 into an irradiating direction D. The irradiating direction D is parallel to an optical axis AC of the discharge lamp 90.

The shape of the discharge lamp 90 is a bar-shape extending along the irradiating direction D. One end (end on the left-hand side in the illustration) of the discharge lamp 90 is defined as a first end 90e1. The other end (end on the right-hand side in the illustration) of the discharge lamp 90 is defined as a second end 90e2. The material of the discharge lamp 90 is, for example, a light-transmissive material such as quartz glass. A center part of the discharge lamp 90 is expanded in a spherical shape and the inside thereof is a discharge space 91. In the discharge space 91, a gas that is a discharge medium containing a rare gas, metal halogen compound or the like is enclosed.

In the discharge space 91, distal ends of a first electrode (electrode) 92 and a second electrode (electrode) 93 are protruding. The first electrode 92 is arranged on the side of the first end 90e1 of the discharge space 91. The second electrode 93 is arranged on the side of the second end 90*e*2 in the discharge space 91. The shape of the first electrode 92 and the second electrode 93 is a bar-shape extending along the optical axis AX. In the discharge space 91, electrode distal ends of the first electrode 92 and the second electrode 93 are arranged facing each other at a predetermined distance from each other. The material of the first electrode 92 and the second electrode 93 is, for example, a metal such as tungsten.

A first terminal 536 is provided at the first end 90*e*1 of the discharge lamp 90. The first terminal 536 and the first electrode 92 are electrically connected to each other by a conductive member 534 penetrating the inside of the discharge lamp 90. Similarly, a second terminal 546 is provided at the second end 90*e*2 of the discharge lamp 90. The second terminal 546 and the second electrode 93 are electrically connected to each other by a conductive member 544 penetrating the inside of the discharge lamp 90. The material of the first terminal 536 and the second terminal 546 is, for example, a metal such as tungsten. As the material of the conductive members 534, 544, for example, a molybdenum foils is used.

The first terminal 536 and the second terminal 546 are connected to the discharge lamp lighting device 10. The discharge lamp lighting device 10 supplies the drive current for driving the discharge lamp 90, to the first terminal 536 and the second terminal 546. Consequently, arc discharge occurs between the first electrode 92 and the second electrode 93. The light (discharge light) generated by the arc discharge is radiated in all directions from the discharge position, as indicated by dashed line arrows.

The main reflection mirror 112 is fixed to the first end 90*e*1 of the discharge lamp 90 by a fixing member 114. The main reflection mirror 112 reflects the light that travels opposite to the irradiating direction D, of the discharge light, into the irradiating direction D. The shape of the reflection surface (surface on the side of the discharge lamp 90) of the main reflection mirror 112 is not particularly limited as long as it is within a range in which the mirror can reflect the discharge light into the irradiating direction D. The shape of the reflection surface may be, for example, a rotating elliptic shape or a rotating parabolic shape. For example, if the shape of the reflection surface of the main reflection mirror 112 is a rotating parabolic shape, the main reflection mirror 112 can convert the discharge light into light that is substantially parallel to the optical axis AX. This enables omission of the parallelizing lens 305.

The sub reflection mirror 50 is fixed on the side of the second end 90*e*2 by a fixing member 522. The shape of the reflection surface (surface on the side of the discharge lamp 90) of the sub reflection mirror 50 is a spherical shape surrounding the portion on the side of the second end 90*e*2, of the discharge space 91. The sub reflection mirror 50 reflects the light that travels opposite to the side where the main reflection mirror 112 is arranged, of the discharge light, toward the main reflection mirror 112. Thus, the utilization efficiency of the light radiated from the discharge space 91 can be enhanced.

The material of the fixing members 114, 522 is not particularly limited as long as it is within a range of heat-resistant material that can resist heat generation from the discharge lamp 90. For example, an inorganic adhesive may be used. The method for fixing the arrangement of the main reflection mirror 112 and the sub reflection mirror 50 in relation to the discharge lamp 90 is not limited to the method in which the main reflection mirror 112 and the sub reflection mirror 50 are fixed to the discharge lamp 90, and an arbitrary method can be employed. For example, the discharge lamp 90 and the main reflection mirror 112 may be separately fixed to a casing (not shown) of the projector 500. The same can be applied to the sub reflection mirror 50.

Hereinafter, the circuit configuration of the projector 500 will be described.

Figure 3:
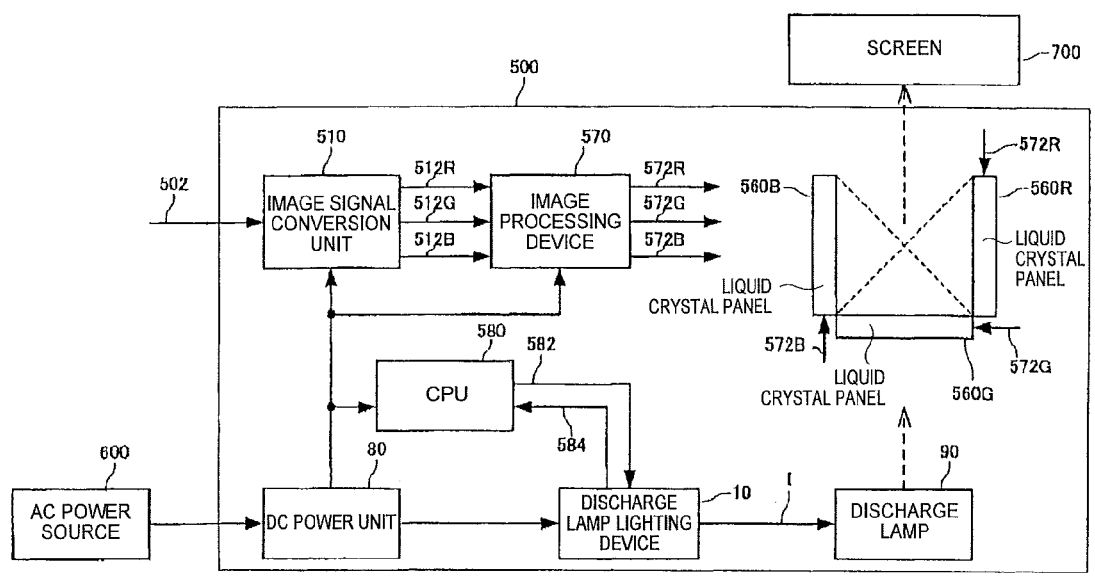
FIG. 3 is a block diagram showing various components of the projector of the first embodiment.

FIG. 3 shows an example of the circuit configuration of the projector 500 of this embodiment. The projector 500 includes an image signal conversion unit 510, a DC power unit 80, the liquid crystal panels 560R, 560G, 560B, an image processing device 570, and a CPU (central processing unit) 580, in addition to the optical system shown in FIG. 1.

The image signal conversion unit 510 converts an image signal 502 inputted from outside (such as luminance and color difference signals or analog RGB signals) to digital RGB signals with a predetermined word length, thus generates image signals 512R, 512G, 512B and supplies the image signals to the image processing device 570.

The image processing device 570 carries out image processing on each of the three image signals 512R, 512G, 512B. The image processing device 570 supplies drive signals 572R, 572G, 572B for driving the liquid crystal panels 560R, 560G, 560B, respectively, to the liquid crystal panels 560R, 560G, 560B.

The DC power unit 80 converts an AC voltage supplied from an external AC power source 600 into a predetermined DC voltage. The DC power unit 80 supplies the DC voltage to the image signal conversion unit 510 and the image processing device 570 on the secondary side of a transformer (not shown but included in the DC power unit 80) and to the discharge lamp lighting device 10 on the primary side of the transformer.

The discharge lamp lighting device 10, on startup, generates a high inter-electrode voltage of the discharge lamp 90 and thus causes insulation breakdown to form a discharge path. Subsequently, the discharge lamp lighting device 10 supplies a drive current I for the discharge lamp 90 to maintain discharge.

The liquid crystal panels 560R, 560G, 560B are provided in the liquid crystal light valves 330R, 330G, 330B, respectively. The liquid crystal panels 560R, 560G, 560B modulate the transmittance (luminance) of the color lights incident on the respective liquid crystal panels 560R, 560G, 560B via the foregoing optical system, based on the respective drive signals 572R, 572G, 572B.

The CPU 580 controls various operations from the start of lighting of the projector 500 to turning off of the lighting. For example, in the example of FIG. 3, the CPU 580 outputs a lighting command or turning-off command to the discharge lamp lighting device 10 via a communication signal 582. The CPU 580 receives lighting information of the discharge lamp from the discharge lamp lighting device 10 via a communication signal 584.

Hereinafter, the configuration of the discharge lamp lighting device 10 will be described.

Figure 4:
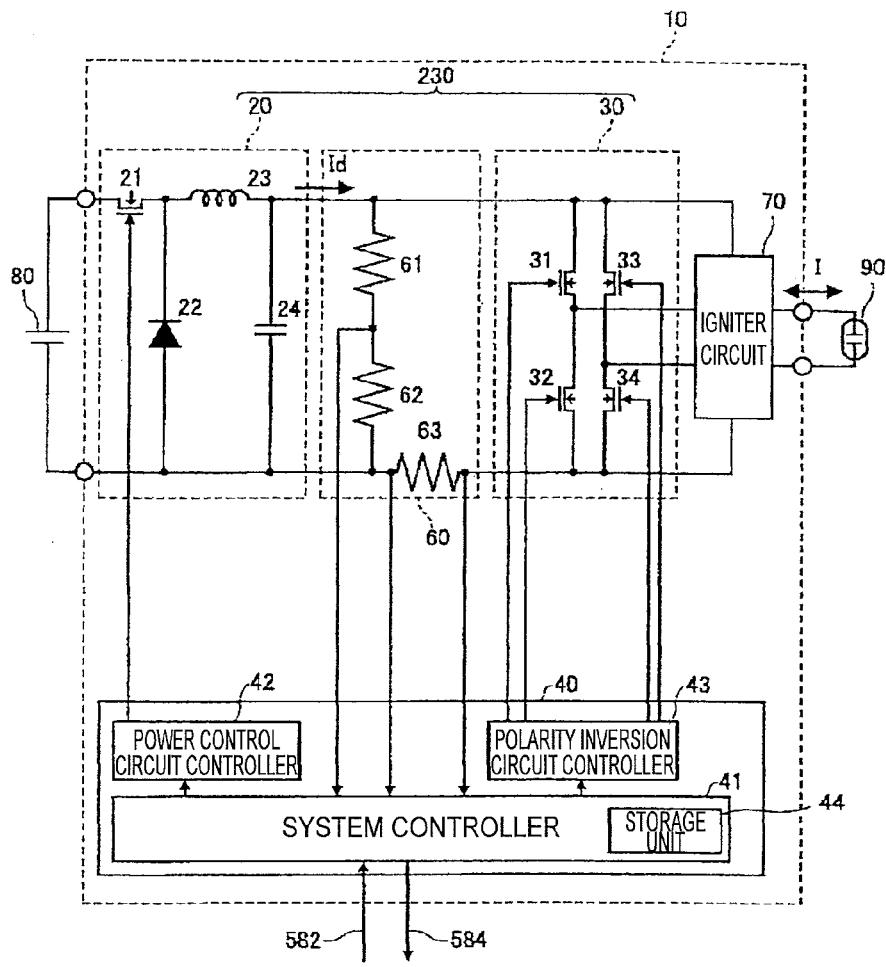
FIG. 4 is a circuit diagram showing a discharge lamp lighting device of the first embodiment.

FIG. 4 shows an example of the circuit configuration of the discharge lamp lighting device 10.

As shown in FIG. 4, the discharge lamp lighting device 10 has a power control circuit 20, a polarity inversion circuit 30, a control unit 40, a storage unit 44, an operation detection unit 60, and an igniter circuit 70.

The power control circuit 20 generates the drive power to be supplied to the discharge lamp 90. In this embodiment, the power control circuit 20 is made up of a step-down chopper circuit which takes the voltage from the DC power unit 80 as an input, lowers the input voltage and outputs a direct current Id.

The power control circuit 20 includes a switch element 21, a diode 22, a coil 23, and a capacitor 24. The switch element 21 is made up of, for example, a transistor. In this embodiment, one end of the switch element 21 is connected to the positive voltage side of the DC power unit 80, and the other end is connected to a cathode terminal of the diode 22 and one end of the coil 23.

One end of the capacitor 24 is connected to the other end of the coil 23, and the other end of the capacitor 24 is connected to an anode terminal of the diode 22 and the negative voltage side of the DC power unit 80. A current control signal from the control unit 40, later described, is inputted to a control terminal of the switch element 21 and the switch element 21 is thus on/off-controlled. As the current control signal, for example, a PWM (pulse width modulation) control signal may be used.

As the switch element 21 is switched on, a current flows through the coil 23 and energy is accumulated in the coil 23. As the switch element 21 is subsequently switched off, the energy accumulated in the coil 23 is discharged through a route passing through the capacitor 24 and the diode 22. Consequently, a direct current Id corresponding to the proportion of the time when the switch element 21 is on is generated.

The polarity inversion circuit 30 inverts the polarity of the direct current Id inputted from the power control circuit 20, at a predetermined timing. Thus, the polarity inversion circuit 30 generates and outputs a drive current I that is a direct current continuing for a controlled time, or a drive current I that is an alternating current with an arbitrary frequency. In this embodiment, the polarity inversion circuit 30 is made up of an inverter bridge circuit (full bridge circuit).

The polarity inversion circuit 30 includes a first switch element 31, a second switch element 32, a third switch element 33, and a fourth switch element 34 which are made up of, for example, transistors or the like. The polarity inversion circuit 30 is configured in such a way that the first switch element 31 and the second switch element 32, connected in series, and the third switch element 33 and the fourth switch element 34, connected in series, are connected in parallel. A polarity inversion control signal is inputted to each of control terminals of the first switch element 31, the second switch element 32, the third switch element 33 and the fourth switch element 34 from the control unit 40. Based on the polarity inversion control signal, the on/off operation of the first switch element 31, the second switch element 32, the third switch element 33 and the fourth switch element 34 is controlled.

In the polarity inversion circuit 30, an operation to alternately switch on and off the first switch element 31 and the fourth switch element 34 on one hand and the second switch element 32 and the third switch element 33 on the other is repeated. Thus, the polarity of the direct current Id outputted from the power control circuit 20 is alternately inverted. The polarity inversion circuit 30 generates and outputs a drive current I that is a direct current maintaining the same polarity state for a controlled time, or a drive current I that is an alternating current with a controlled frequency, from a common connection point between the first switch element 31 and the second switch element 32 and a common connection point between the third switch element 33 and the fourth switch element 34.

That is, the polarity inversion circuit 30 is controlled in such a way that when the first switch element 31 and the fourth switch element 34 are on, the second switch element 32 and the third switch element 33 are off, whereas when the first switch element 31 and the fourth switch element 34 are off, the second switch element 32 and the third switch element 33 are on. Therefore, when the first switch element 31 and the fourth switch element 34 are on, a drive current I flowing from one end of the capacitor 24 in the order of the first switch element 31, the discharge lamp 90 and the fourth switch element 34 is generated. When the second switch element 32 and the third switch element 33 are on, a drive current I flowing from one end of the capacitor 24 in the order of the third switch element 33, the discharge lamp 90 and the second switch element 32 is generated.

In this embodiment, a section made up of the power control circuit 20 and the polarity inversion circuit 30 is equivalent to a discharge lamp driving unit 230. That is, the discharge lamp driving unit 230 supplies the drive current I for driving the discharge lamp 90, to the discharge lamp 90.

The control unit 40 controls the discharge lamp driving unit 230. In the example of FIG. 4, the control unit 40 controls the power control circuit 20 and the polarity inversion circuit 30 and thereby controls the duration for which the drive current I maintains the same polarity, a current value of the drive current I, the frequency, a lighting mode and the like.

The control unit 40 performs polarity inversion control on the polarity inversion circuit 30 so as to control the duration for which the drive current I maintains the same polarity, the frequency of the drive current I or the like, using the polarity inversion timing of the drive current I. The control unit 40 performs current control on the power control circuit 20 so as to control the current value of the direct current Id to be outputted.

In this embodiment, the control unit 40 is capable of executing a stationary lighting mode (stationary lighting driving) in which stationary lighting power (first drive power) Ws is supplied to the discharge lamp 90, and a high-power mode (high-power driving) in which refresh power (second drive power) Wr that is higher than the stationary lighting power Ws is supplied to the discharge lamp 90. In this embodiment, the refresh power Wr is, for example, equal to or below rated power Wt of the discharge lamp 90.

The control unit 40 sets first execution information of the high-power mode on the basis of first information, described later, at a predetermined setting timing. Details thereof will be described later.

The term "setting timing" used herein not only means the moment when the first execution information is set but also means the entire period when the control unit 40 operates to set the first execution information, including reference to various kinds of information.

Also, the first execution information mentioned herein is execution information of the high-power mode.

The configuration of the control unit 40 is not particularly limited. In this embodiment, the control unit 40 includes a system controller 41, a power control circuit controller 42, and a polarity inversion circuit controller 43. The control unit 40 may be partly or entirely made up of a semiconductor integrated circuit.

The system controller 41 controls the power control circuit controller 42 and the polarity inversion circuit controller 43 and thereby controls the power control circuit 20 and the polarity inversion circuit 30. The system controller 41 may control the power control circuit controller 42 and the polarity inversion circuit controller 43, based on a lamp voltage (inter-electrode voltage) detected by the operation detection unit 60 and the drive current I.

In this embodiment, the storage unit 44 is connected to the system controller 41.

The system controller 41 controls the power control circuit 20 and the polarity inversion circuit 30, based on information stored in the storage unit 44. In the storage unit 44, for example, information about drive parameters is stored, such as the duration for which the drive current I maintains the same polarity, and the current value, frequency, waveform, modulation pattern or the like of the drive current I.

The storage unit 44 is controlled by the control unit 40 and the first information about the high-power mode is stored in the storage unit 44.

The first information includes all the information about the high-power mode. The first information may include, for example, the waveform of the drive current I, the drive power (refresh power Wr), the execution time, the lamp voltage and the drive refreshing effect in the high-power mode, the time when the high-power mode is ended, the lighting time of the discharge lamp 90 during the period from the end of the high-power mode and up to the next setting timing, or the like. The drive refreshing effect is the magnitude of the heat load applied to the first electrode 92 and the second electrode 93. Details thereof will be described in a seventh embodiment.

In the storage unit 44, the first execution information of the high-power mode corresponding to the first information, and a lookup table, an arithmetic formula and the like for obtaining the first execution information of the high-power mode on the basis of the first information are stored.

The first execution information of the high-power mode includes all the information that is necessary for executing the high-power mode. The first execution information may include, for example, a high-power mode restraining time (restraining time) when the execution of the high-power mode is restrained, whether to execute the high-power mode or not, a drive parameter of the high-power mode, and the like.

The first information is referred to by the system controller 41 at a setting timing for the setting about the first execution information of the high-power mode. The system controller 41 (control unit 40) sets the first execution information of the high-power mode according to the first information in the storage unit 44 and controls the drive current I. The first information is updated or accumulated and stored in the storage unit 44, for example, every time the high-power mode is executed.

The power control circuit controller 42 outputs a current control signal to the power control circuit 20, based on a control signal from the system controller 41, and thereby controls the power control circuit 20.

The polarity inversion circuit controller 43 outputs a polarity inversion control signal to the polarity inversion circuit 30, based on a control signal from the system controller 41, and thereby controls the polarity inversion circuit 30.

The control unit 40 can be realized by using a dedicated circuit and can be configured to perform the above controls and various controls of processing, described later. The control unit 40 can also be configured to function as a computer and perform the various controls of processing, for example, by causing the CPU to execute a control program stored in the storage unit 44.

Figure 5:
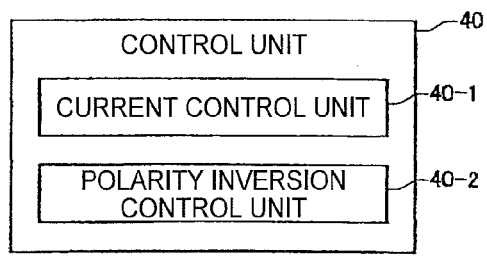
FIG. 5 is a block diagram showing an example of configuration of a control unit of the first embodiment.

FIG. 5 illustrates another example of the configuration of the control unit 40. As shown in FIG. 5, the control unit 40 may be configured to function as a current control unit 40-1 which controls the power control circuit 20 and as a polarity inversion control unit 40-2 which controls the polarity inversion circuit 30, based on a control program.

In the example shown in FIG. 4, the control unit 40 is configured as a part of the discharge lamp lighting device 10. Meanwhile, the CPU 580 may be configured to take charge of a part of the functions of the control unit 40.

The operation detection unit 60 may include, for example, a voltage detection unit which detects the lamp voltage of the discharge lamp 90 and outputs drive voltage information to the control unit 40, a current detection unit which detects the drive current I and outputs drive current information to the control unit 40, and the like. In this embodiment, the operation detection unit 60 includes a first resistor 61, a second resistor 62, and a third resistor 63.

In this embodiment, the voltage detection unit detects the lamp voltage based on the voltage divided by the first resistor 61 and the second resistor 62, which are connected in parallel with the discharge lamp 90 and connected in series with each other. In this embodiment, the current detection unit detects the drive current I based on the voltage generated at the third resistor 63 connected in series with the discharge lamp 90.

The igniter circuit 70 operates only when the lighting of the discharge lamp 90 starts. The igniter circuit 70 supplies a high voltage (higher voltage than in normal lighting of the discharge lamp 90) that is necessary for breaking insulation between the electrodes (between the first electrode 92 and the second electrode 93) of the discharge lamp 90 and thus forming a discharge path, between the electrodes (between the first electrode 92 and the second electrode 93) of the discharge lamp 90 when starting the lighting of the discharge lamp 90. In this embodiment, the igniter circuit 70 is connected to the discharge lamp 90 in parallel.

Hereinafter, the relation between the polarity of the drive current I and the temperature of the electrodes will be described.

Figures 6A, 6B:
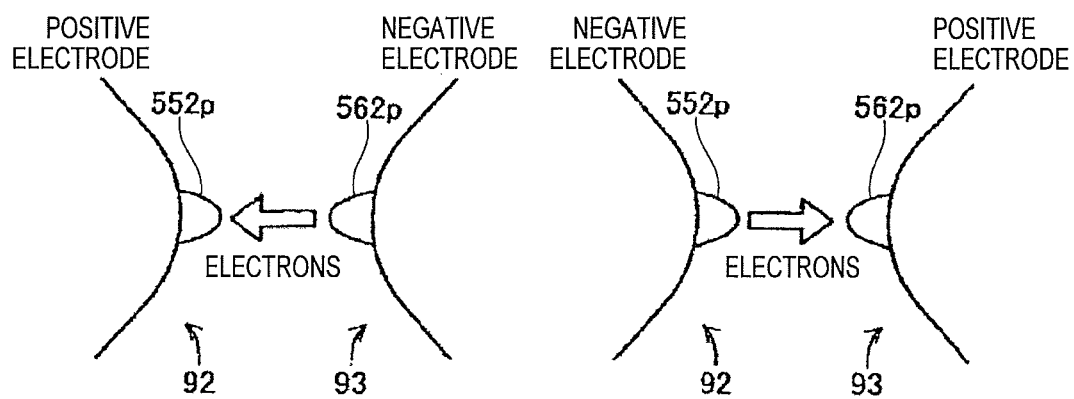
FIGS. 6A and 6B show the state of protrusions at the distal ends of electrodes of the discharge lamp.

FIGS. 6A and 6B show the operating states of the first electrode 92 and the second electrode 93.

FIGS. 6A and 6B show distal end parts of the first electrode 92 and the second electrode 93. Protrusions 552p, 562p are formed at distal ends of the first electrode 92 and the second electrode 93, respectively. Discharge occurring between the first electrode 92 and the second electrode 93 is mainly generated between the protrusion 552p and the protrusion 562p.

FIG. 6A shows a first polarity state where the first electrode 92 operates as a positive electrode and the second electrode 93 operates as a negative electrode. In the first polarity state, discharge causes electrons to move from the second electrode 93 (negative electrode) to the first electrode 92 (positive electrode). Electrons are discharged from the negative electrode (second electrode 93). The electrons discharged from the negative electrode (second electrode 93) collide with the distal end of the positive electrode (first electrode 92). This collision generates heat, raising temperature at the distal end (protrusion 552p) of the positive electrode (first electrode 92). Meanwhile, temperature falls at the distal end (protrusion 562p) of the negative electrode (second electrode 93) on the electron discharging side.

FIG. 6B shows a second polarity state where the first electrode 92 operates as the negative electrode and the second electrode 93 operates as the positive electrode. In the second polarity state, contrary to the first polarity state, electrons move from the first electrode 92 to the second electrode 93. Consequently, temperature increases at the distal end (protrusion 562p) of the second electrode 93.

Meanwhile, temperature falls at the distal end (protrusion 552p) of the first electrode 92.

As described above, temperature increases in the positive electrode, with which electrons collide, whereas temperature falls in the negative electrode, which discharges electrons. That is, in the first polarity state, the temperature of the first electrode 92 increases and the temperature of the second electrode 93 falls. In the second polarity state, the temperature of the second electrode 93 increases and the temperature of the first electrode 92 falls.

In this way, the temperature of the positive electrode, with which electrons collide, tends to be higher than the temperature of the negative electrode, which discharges electrons. Here, as the temperature of one electrode remains higher than the temperature of the other electrode for a long time, it may cause various inconveniences. For example, if the distal end of the high-temperature electrode is melted excessively, unintended deformation of the electrode can occur. Consequently, the distance between the electrodes (arc length) may become deviated from a proper value, causing unstable illuminance. Meanwhile, if the distal end of the low-temperature electrode is melted insufficiently, micro irregularities generated at the distal end may remain without melting. Consequently, a so-called arc jump may occur (the arc position may become unstable and move).

The first electrode 92 and the second electrode 93 have a similar configuration. Therefore, in the description below, only the first electrode 92 may be mentioned as a representative example. Also, the protrusion 552p at the distal end of the first electrode 92 and the protrusion 562p at the distal end of the second electrode 93 have a similar configuration. Therefore, in the description below, only the protrusion 552p may be mentioned as a representative example.

Next, control of the drive power supplied to the discharge lamp 90 in this embodiment, that is, control of the discharge lamp driving unit 230 by the control unit 40 in this embodiment will be described.

Figure 7:
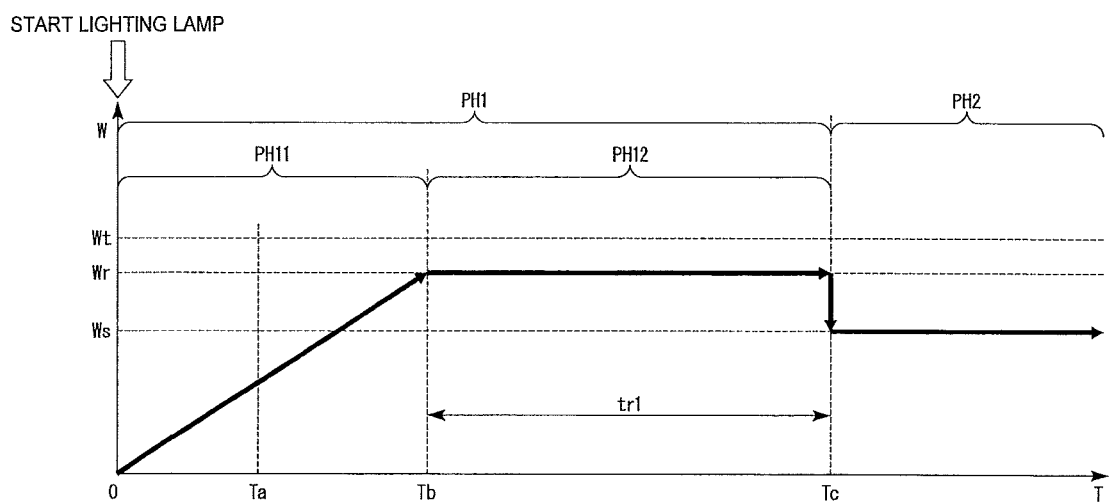
FIG. 7 shows an example of a drive power waveform according to the first embodiment.

FIG. 7 shows a waveform of the drive power in this embodiment. In FIG. 7, the vertical axis represents drive power W and the horizontal axis represents time T. FIG. 7 shows change in the drive power W from the time point when the discharge lamp 90 is lit to the time when the stationary lighting state begins.

As shown in FIG. 7, as the lighting of the discharge lamp 90 is started, the drive power gradually increases and then reaches predetermined target power. At this point, the plasma density inside the discharge lamp 90 is small and the temperature is low. The drive power W is unstable. After that, as the plasma density increases and temperature inside the discharge lamp 90 increases, the drive power W becomes stable. The period from the start of the lighting of the discharge lamp 90 to the time when the drive power W is stabilized is defined as a launching period PH1. Following the launching period PH1, a period in which the discharge lamp 90 is continuously lit starts. This period is defined as a stationary lighting period PH2.

In the drive power waveform of this embodiment, the launching period PH1 has a first launching period PH11 in which the drive power W gradually increases toward the refresh power (second drive power) Wr and a second launching period PH12 in which the drive power W is kept constant at the value of the refresh power Wr. That is, the second launching period PH12 is a high-power lighting period in which the discharge lamp 90 is driven in the high-power mode. In other words, in this embodiment, the high-power mode is executed in the launching period PH1 from when the discharge lamp 90 is lit to when a shift to the stationary lighting period PH2 is made.

The duration of the first launching period PH11 and the duration of the second launching period PH12 (execution time tr1) can be set suitably.

The stationary lighting period PH2 is a period when a stationary lighting mode is executed in which the stationary lighting power (first drive power) Ws is supplied to the discharge lamp 90. The stationary lighting power Ws is lower than the refresh power Wr in the second launching period PH12.

Specifically, as an example, the rated power Wt of the discharge lamp 90 is 200 W, the stationary lighting power Ws is 140 W, and the refresh power Wr is 190 W.

In the first launching period PH11 from the start of the lighting of the lamp, that is, time 0, to time Tb, the drive power W linearly increases from 0 W to 190 W. In the second launching period PH12 from the time Tb to time Tc, the drive power W is kept constant at 190 W. In the stationary lighting period PH2 following the time Tc, the drive power W is kept constant at 140 W. As an example, the time Tb is the time point of 45 seconds from the start of the lighting of the lamp. As an example, the time Tc is the time point of 100 seconds from the start of the lighting of the lamp. That is, for example, the execution time tr1 of the high-power mode is a period of 55 seconds.

The control unit 40 shown in FIG. 4 sets the first execution information of the high-power mode on the basis of the first information about the high-power mode and the second information about the lighting state of the discharge lamp 90 at the setting timing, and controls the discharge lamp driving unit 230 according to the first execution information.

The second information includes all the information about the lighting state of the discharge lamp 90 at the setting timing for setting the first execution information of the high-power mode. The second information may be, for example, drive parameters such as the cumulative lighting time of the discharge lamp 90 at the setting timing, the lamp voltage, the lighting mode, and the drive power.

Specifically, in this embodiment, the control unit 40 detects the degree of deterioration of the discharge lamp 90 with reference to the lamp voltage (second information) and acquires the value of the refresh power Wr (first information) corresponding to the degree of deterioration of the discharge lamp 90 with reference to the storage unit 44. Thus, the first execution information of the high-power mode is properly set.

As the deterioration (wear) of the discharge lamp 90 progresses, the lamp voltage increases with an increase in the distance between the electrodes. In this case, the refresh power Wr needs to be raised to melt the protrusions at the distal ends of the electrodes further. Particularly when the discharge lamp 90 is driven in the low-power mode, only the distal ends of the electrodes are melted and form micro protrusions. In the low-power mode, the electrodes do not easily melt. Therefore, the protrusions can be easily deformed, causing the projection screen to flicker. However, by properly forming micro protrusions, arc discharge is stabilized by the protrusions and the flickering can be restrained.

If the refresh power Wr is raised in a new discharge lamp 90 that is not deteriorated, the distal ends of the electrodes melt excessively and micro protrusions disappear. In a discharge lamp 90 which is deteriorated, since the current value is lowered, the electrodes can be properly melted while the degree of deterioration is maintained. Therefore, the refresh power Wr is set to be relatively low for the discharge lamp 90 which is not deteriorated, and the refresh power Wr is set to be relatively high for the discharge lamp 90 which is deteriorated. In other words, the refresh power Wr is set to be higher as the lamp voltage increases. By thus finding the correlation between a lamp voltage and optimum refresh power Wr corresponding to the lamp voltage in advance, the designer of the projector can restrain the flickering of the projection screen. An example of the correlation between the lamp voltage and the refresh power Wr is shown in Table 1.

TABLE 1

| Lamp Voltage (V) | Drive Power (W) in High-Power Mode (Refresh Power Wr) |
| --- | --- |
| 0 to 60 | 140 |
| 61 to 70 | 170 |
| 71 to 80 | 180 |
| 81 to 90 | 190 |
| 91 and above | 200 |

Figure 8:
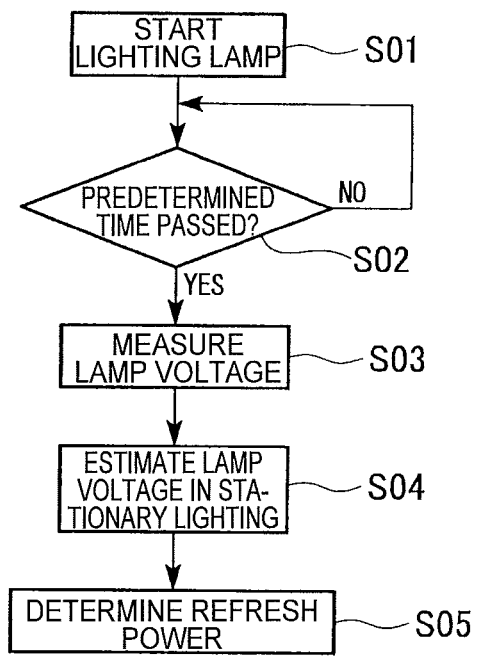
FIG. 8 is a flowchart showing an example of a control procedure for a discharge lamp driving unit by the control unit of the first embodiment.

Next, the control of the discharge lamp driving unit 230 by the control unit 40 will be described. In the following description, a first procedure in which the control unit 40 refers to the lamp voltage (inter-electrode voltage) and then determines the refresh power Wr will be described with reference to FIG. 8.

The time until referring to the lamp voltage in the first launching period PH11 after the lighting of the discharge lamp 90 is started (Step S01), that is, time Ta when the lamp voltage is referred to, is set in advance. The time Ta is set, for example, as the time point of 20 seconds from the start of the lighting of the lamp. The control unit 40 determines whether the time Ta (20 seconds) has passed from the start of the lighting of the discharge lamp 90 or not (Step S02).

If the time Ta (20 seconds) has passed, the control unit 40 refers to the lamp voltage (Step S03). In the first launching period PH11, the lamp voltage gradually increases with an increase in the drive power. Therefore, the lamp voltage that is referred to at the time Ta is different from the lamp voltage in the stationary lighting period PH2. Thus, the designer of the projector prepares, in advance, a conversion formula for finding the lamp voltage in the stationary lighting period PH2 from the lamp voltage value at the time Ta, or a conversion table based on statistical values of voltage transition that are actually measured with plural discharge lamps, and stores the conversion formula or conversion table in the storage unit 44 in advance. An example of the conversion table is shown in Table 2.

Table 2 shows the relation with the refresh power Wr shown Table 1, in addition to the relation between the lamp voltage at the time Ta and the lamp voltage in the stationary lighting period PH2.

TABLE 2

| Lamp Voltage (V) at Time Ta | Lamp Voltage (V) in Stationary Lighting Period | Drive Power (W) in High-Power Mode (Refresh Power Wr) |
| --- | --- | --- |
| To 21 | 0 to 60 | 140 |
| 22 to 24 | 61 to 70 | 170 |
| 25 to 28 | 71 to 80 | 180 |
| 29 to 32 | 81 to 90 | 190 |
| 33 and above | 91 and above | 200 |

The control unit 40 estimates the lamp voltage in the stationary lighting period PH2, based on Table 2 (Step S04), and determines the refresh power Wr (Step S05). For example, if the lamp voltage that is referred to at the time Ta is 30 V, the estimate value of the lamp voltage in the stationary lighting period PH2 is found as 81 to 90 V from Table 2. In this case, the value of optimum refresh power Wr is 190 W, having the drive power waveform as shown in FIG. 7.

In this embodiment, Steps S03 to S05 are equivalent to the setting timing. The time Ta is an arbitrary time point in the first launching period PH11. That is, in this embodiment, the setting timing is set at an arbitrary time point in the first launching period PH11.

In this way, the control unit 40 determines the refresh power Wr and controls the discharge lamp driving unit 230. The discharge lamp 90 is thus driven.

The control of the discharge lamp driving unit 230 by the control unit 40 can also be expressed as a discharge lamp driving method. That is, the discharge lamp driving method of this embodiment includes a stationary lighting mode in which the stationary lighting power Ws is supplied to the discharge lamp 90 having the first electrode 92 and the second electrode 93, and a high-power mode in which the refresh power Wr that is higher than the stationary lighting power Ws is supplied to the discharge lamp 90. In the discharge lamp driving method, first execution information of the high-power mode is set on the basis of first information about the high-power mode, at a predetermined setting timing.

According to this embodiment, the first execution information of the high-power mode is set on the basis of the first information about the high-power mode stored in the storage unit 44. Therefore, the magnitude of the heat load applied to the protrusion 552*p* of the first electrode 92 at the time of the high-power mode can be adjusted according to the state of the protrusion 552*p*. Thus, according to this embodiment, excessive melting of the protrusion 552*p* can be restrained and the discharge of the discharge lamp 90 can be maintained stably.

Also, according to this embodiment, the refresh power Wr is set to be equal to or below the rated power Wt of the discharge lamp 90. Therefore, the refresh power Wr does not exceed the rated power Wt of the discharge lamp 90, thus avoiding the application of an excessive load to the discharge lamp 90. Thus, according to the embodiment, the discharge of the discharge lamp 90 can be maintained stably.

Moreover, according to this embodiment, as described above, in the discharge lamp lighting device 10, the drive power waveform has the first launching period PH11 in which the drive power W gradually increases toward the refresh power Wr and the second launching period PH12 in which the drive power W is kept constant at the value of the refresh power Wr, as the launching period PH1 of the discharge lamp 90. Moreover, the control unit 40 is configured to adjust the value of the refresh power Wr according to the degree of deterioration of the discharge lamp 90, that is, configured to set the first execution information of the high-power mode on the basis of the first information and the second information.

Therefore, regardless of the degree of deterioration of the discharge lamp 90, the protrusions at the distal ends of the electrodes can be constantly melted properly and the shape of the protrusions can be maintained. Consequently, since the discharge is stabilized, the light source 200 with less change in illuminance and a long service life can be realized. Thus, the projector 500 with excellent display definition and high reliability can be realized.

In this embodiment, the control unit 40 is configured to refer to the lamp voltage at an arbitrary time Ta within the first launching period PH11 and estimate the lamp voltage in the stationary lighting period PH2 on the basis of the result of the reference to the lamp voltage. According to this configuration, since the lamp voltage in the first launching period PH11 is referred to every time the discharge lamp is lit, the lamp voltage in the stationary lighting period PH2 can be estimated precisely and the degree of deterioration of the discharge lamp 90 can be detected accurately.

However, as the procedure from the reference to the lamp voltage to the determination on the refresh power Wr, the following second procedure may be employed instead of the above first procedure. In the second procedure, the control unit 40 stores the lamp voltage that is referred to at the time of previous lighting of the discharge lamp, for example, in the storage unit 44 in advance. After that, at the time of next lighting of the discharge lamp, the control unit 40 reads out the lamp voltage from the storage unit 44 and estimates the lamp voltage in the stationary lighting period PH2 on the basis of the result of the reading.

In the case where the second procedure is employed, the inter-electrode voltage that is already stored at the time of previous lighting is referred to at the time of next lighting. Therefore, the lamp voltage in the stationary lighting period PH2 can be easily estimated without referring to the lamp voltage within the launching period PH1, and the degree of deterioration of the discharge lamp 90 can be detected accurately.

The lamp voltage at the time of previous lighting of the discharge lamp is equivalent to third information in a fourth embodiment, described later.

In the above embodiment, for example, the degree of deterioration of the discharge lamp is detected by referring to the lamp voltage. However, instead of this configuration, the degree of deterioration of the discharge lamp may be detected, for example, by referring to the cumulative lighting time (second information) of the discharge lamp and without referring to the lamp voltage. In this case, a table or the like showing the relation between the cumulative lighting period of the discharge lamp and the refresh power Wr may be prepared. The specific configurations of the discharge lamp driving device, the light source and the projector are not limited to the example of the above embodiment and suitable changes can be made.

Also, according to the embodiment, the refresh power Wr may be configured to be higher than the rated power Wt.

Second Embodiment

A second embodiment is different from the first embodiment in that the control unit 40 set a high-power mode restraining time on the basis of the first information about the lighting state in the previous high-power mode.

In the description below, the similar configurations to those of the foregoing embodiment may be denoted by the same reference numerals as needed and not described further in detail.

Figure 9:
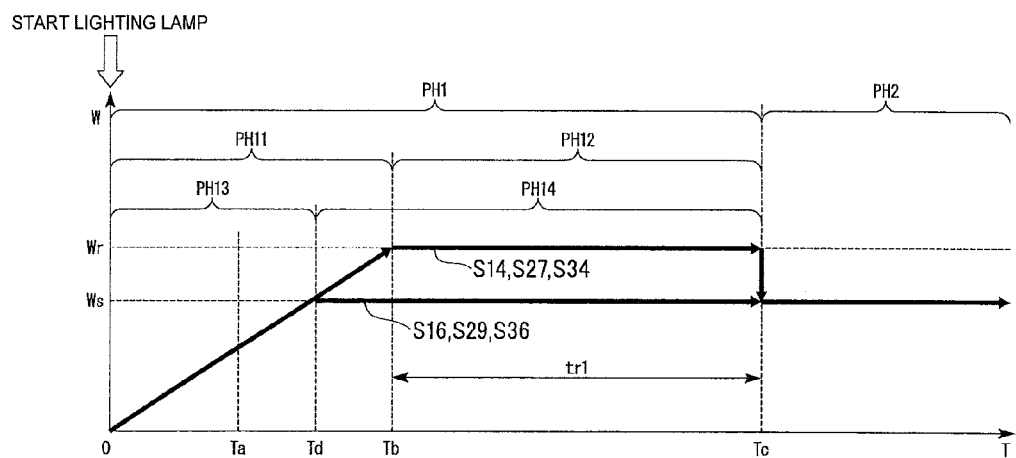
FIG. 9 shows an example of a drive power waveform according to a second embodiment.

FIG. 9 shows a drive power waveform according to this embodiment. In FIG. 9, the vertical axis represents drive power W and the horizontal axis represents time T. FIG. 9 shows change in the drive power W from the time point when the discharge lamp 90 is lit to the time when the stationary lighting state begins.

The refresh power Wr, that is, the drive power W in the high-power mode, is set according to the value of the lamp voltage applied to the discharge lamp 90, that is, the value of the lamp voltage detected by the operation detection unit 60. Specifically, the drive power W in the high-power mode is set, for example, as shown in Table 3. The stationary lighting power Ws in this case is, for example, 140 W.

TABLE 3

| Lamp Voltage (V) | Drive Power (W) in High-Power Mode (Refresh Power Wr) |
|---|---|
| To 75 | 160 |
| 76 to 80 | 200 |
| 81 to 90 | 200 |
| 91 to 100 | 200 |
| 101 to 120 | 200 |
| 121 and above | 200 |

As shown in Table 3, for example, the refresh power Wr is set to 200 W in the range where the lamp voltage is higher than 75 V, whereas the refresh power Wr is set to 160 W in the range where the lamp voltage is 75 V or below.

In the range where the lamp voltage is low, the degree of deterioration of the discharge lamp 90 is low and the protrusion 552p of the first electrode 92 easily melts even in the stationary lighting period PH2. Therefore, by setting the drive power in the high-power mode, that is, the refresh power Wr, to be low, excessive melting of the protrusion 552p can be restrained.

The lamp voltage that is referred to in this embodiment is the lamp voltage at the time of the previously executed high-power mode.

Next, the control of the discharge lamp driving unit 230 by the control unit 40 according to this embodiment will be described.

Figure 10:
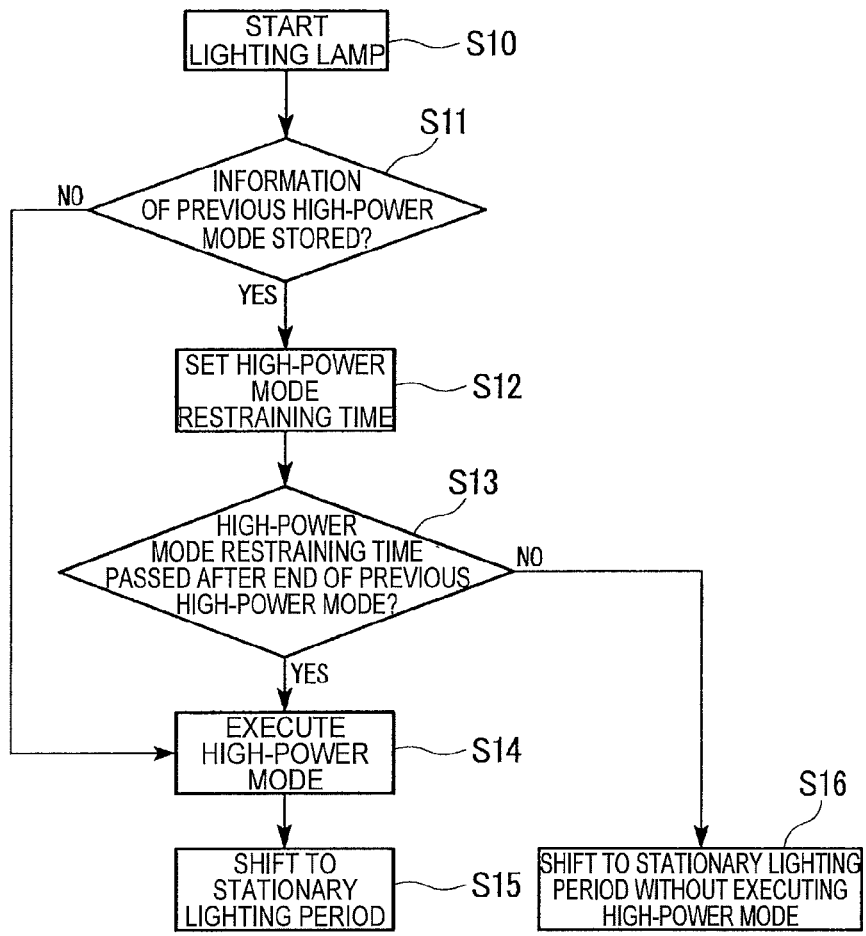
FIG. 10 is a flowchart showing an example of a control procedure for a discharge lamp driving unit by a control unit of the second embodiment.

FIG. 10 is a flowchart showing an example of the control procedure for the discharge lamp driving unit 230 by the control unit 40 according to this embodiment.

As shown in FIG. 10, the lighting of the discharge lamp 90 is started (Step S10), and the control unit 40 refers to the storage unit 44 and determines whether first information about the previous high-power mode is stored or not (Step S11). If the first information is stored (Step S11: YES), the control unit 40 sets a high-power mode restraining time (first execution information) on the basis of the first information (Step S12).

The high-power mode restraining time is the lighting time of the discharge lamp 90 until the next high-power mode becomes executable after the high-power mode is executed. That is, if the lighting time of the discharge lamp 90 after the previous high-power mode is executed is equal to or shorter than the high-power mode restraining time, no high-power mode is executed then.

In this embodiment, the high-power mode restraining time is set, using a lookup table showing the relation between the first information and the high-power mode restraining time, stored in the storage unit 44. In the embodiment, as the first information for setting the high-power mode restraining time, for example, the lamp voltage detected at the time of the previous high-power mode is used. A specific example of the lookup table in the embodiment is shown in Table 4.

TABLE 4

| Lamp Voltage (V) in Previous High-Power Mode | High-Power Mode Restraining Time (h) |
|---|---|
| To 75 | 1.5 |
| 76 to 80 | 2.5 |
| 81 to 90 | 6 |

TABLE 4-continued

| Lamp Voltage (V) in Previous High-Power Mode | High-Power Mode Restraining Time (h) |
|---|---|
| 91 to 100 | 9 |
| 101 to 120 | 13.5 |
| 121 and above | 22 |

As can be seen from Table 4, the high-power mode restraining time is set to be longer as the lamp voltage at the time of the previous high-power mode increases. This is because the time for the protrusion 552p to grow sufficiently is longer as the lamp voltage increases. In the case where the power supplied to the discharge lamp 90 is constant, as the lamp voltage increases, the value of the drive current I flowing between the electrodes decreases and the growth of the protrusion 552p becomes slower. Therefore, the time for the protrusion 552p to grow sufficiently after the end of the high-power mode becomes longer.

The increase in the lamp voltage applied to the discharge lamp 90 means deterioration of the discharge lamp 90. Therefore, as the discharge lamp 90 deteriorates, the time required for the protrusion 552p to grow becomes longer.

In the lookup table shown in Table 4, as the degree of deterioration of the discharge lamp 90 from the time point of the end of the previous high-power mode to the next setting timing increases, the high-power mode restraining time becomes longer. That is, the high-power mode restraining time is set according to the increase in the lamp voltage.

If the first information is not stored in the storage unit 44 (Step S11: NO), the control unit 40 shifts the processing to Step S14, where the high-power mode is executed.

Next, the control unit 40 determines whether or not the preset high-power mode restraining time has passed from the time point when the previous high-power mode is ended, that is, from the time point when the second launching period PH12 is ended (Step S13). That is, the control unit 40 determines whether the lighting time after the end of the previous high-power mode (first information) is longer than the high-power mode restraining time or not, and thus determines whether to execute the high-power mode or not (first execution information).

If the high-power mode restraining time has passed (Step S13: YES), the control unit 40 decides to execute the high-power mode and executes the high-power mode at a predetermined timing (Step S14). In this embodiment, since the high-power mode is executed in the launching period PH1, the execution of the high-power mode starts at the time point (time Tb) when the drive power W increases to the refresh power Wr. That is, as shown in FIG. 9, the shift from the first launching period PH11 to the second launching period PH12, which is the execution period of the high-power mode, is made at the time Tb when the drive power W increases to the refresh power Wr.

After that, the control unit 40 shifts the lighting period to the stationary lighting period PH2 at time Tc (Step S15).

Meanwhile, if the high-power mode restraining time has not passed (Step S13: NO), the control unit 40 decides not to execute the high-power mode and shifts the lighting period to the stationary lighting period PH2 without executing the high-power mode (Step S16), as shown in FIG. 10. That is, as shown in FIG. 9, the drive power W is constant from time Td when the drive power W increases to the stationary lighting power Ws, and the lighting period subsequently shifts to the stationary lighting period PH2. In this case, the period from the start of the lighting of the lamp to the time Td is equivalent to a first launching period PH13, and the period from the time Td to the time Tc is equivalent to a second launching period PH14.

In this embodiment, Steps S11 to S13 are equivalent to the setting timing. In this embodiment, the setting timing, that is, Steps S11 to S13, may be provided at any point between the start of the lighting of the lamp and the time Td when the drive power W reaches the stationary lighting power Ws.

In this manner, the control unit 40 controls the discharge lamp driving unit 230 to drive the discharge lamp 90.

The control of the discharge lamp driving unit 230 by the control unit 40 can also be expressed as a discharge lamp driving method. That is, the discharge lamp driving method of this embodiment includes a stationary lighting mode in which the stationary lighting power Ws is supplied to the discharge lamp 90, and a high-power mode in which the refresh power Wr that is higher than the stationary lighting power Ws is supplied to the discharge lamp 90. In the method, first information about the high-power mode is stored, and first execution information of the high-power mode is set on the basis of the first information, at a predetermined setting timing.

In a configuration in which the high-power mode is executed in a predetermined period after the start of the lighting of the lamp, the interval of executing the high-power mode may be short, for example, due to continuous on/off operations of the power supply in a short period, or the like. In such a case, the high-power mode may be executed again before the protrusions at the distal ends of the electrodes melted by the high-power mode grow sufficiently, thus causing excessive melting of the protrusions at the distal ends of the electrodes. Consequently, the distance between the electrodes may expand further, causing a problem that the service life of the lamp (discharge lamp) is reduced.

In contrast, according to this embodiment, the control unit 40 sets the high-power mode restraining time on the basis of the first information about the lighting state of the previous high-power mode, for example, the lamp voltage. The control unit 40 determines whether the lighting time from the end of the previous high-power mode and up to the next setting timing is longer than the high-power mode restraining time or not, and thus determines whether to execute the high-power mode or not. Therefore, the re-execution of the high-power mode before the protrusion 552p of the first electrode 92 grows sufficiently after the end of the high-power mode can be restrained. Thus, according to the embodiment, the excessive melting of the protrusion 552p can be restrained and the expansion of the distance between the electrodes of the discharge lamp 90 can be restrained.

Meanwhile, as the high-power mode is executed, the drive power W supplied to the discharge lamp 90 increases and therefore the intensity of the light emitted from the discharge lamp 90 increases. Thus, if the high-power mode is executed during the stationary lighting period, the intensity of the light emitted from the discharge lamp 90 may change, causing flickering.

In contrast, according to the embodiment, the high-power mode is executed in the launching period PH1. Therefore, the increase in the drive power W in the stationary lighting period PH2 is restrained and the flickering of the discharge lamp 90 can be restrained.

In this embodiment, the following configuration may also be employed.

While the lamp voltage at the time of the previous high-power mode is used as the first information about the high-power mode in the above embodiment, this example is not limiting. In the embodiment, the refresh power Wr or the like at the time of the high-power mode may also be used as the first information. In this case, the high-power mode restraining time is set to be longer as the refresh power Wr at the time of the previous high-power mode increases. This is because the protrusion 552p melts more as the refresh power Wr increases.

In the above embodiment, the control unit 40 sets the first execution information, using the lookup table. However, this example is not limiting. In the embodiment, the control unit 40 may calculate and set the first execution information, for example, using an arithmetic formula.

In the above embodiment, the control unit 40 sets the first execution information, referring only to the first information of the previous high-power mode. However, this example is not limiting. In the embodiment, the control unit 40 may set the first execution information, referring to plural pieces of first information about the high-power mode executed before the setting timing. Specifically, the control unit 40 may correct the lookup table, arithmetic formula or the like stored in the storage unit 44, on the basis of the trend of changes or the like in the plural pieces of first information, and may set the first execution information, using the corrected lookup table, arithmetic formula or the like.

In the embodiment, the first execution information of the high-power mode may be set, using plural pieces of first information. Specifically, the high-power mode restraining time may be set, for example, using the lamp voltage at the time of the high-power mode and the refresh power Wr at the time of the high-power mode.

Third Embodiment

A third embodiment is different from the second embodiment in that second information about the lighting state of the discharge lamp 90 is acquired at a setting timing and that first execution information of the high-power mode is set on the basis of the first information and the second information about the previous high-power mode.

In the description below, the similar configurations to those of the foregoing embodiments may be denoted by the same reference numerals as needed and not described further in detail.

Figure 11:
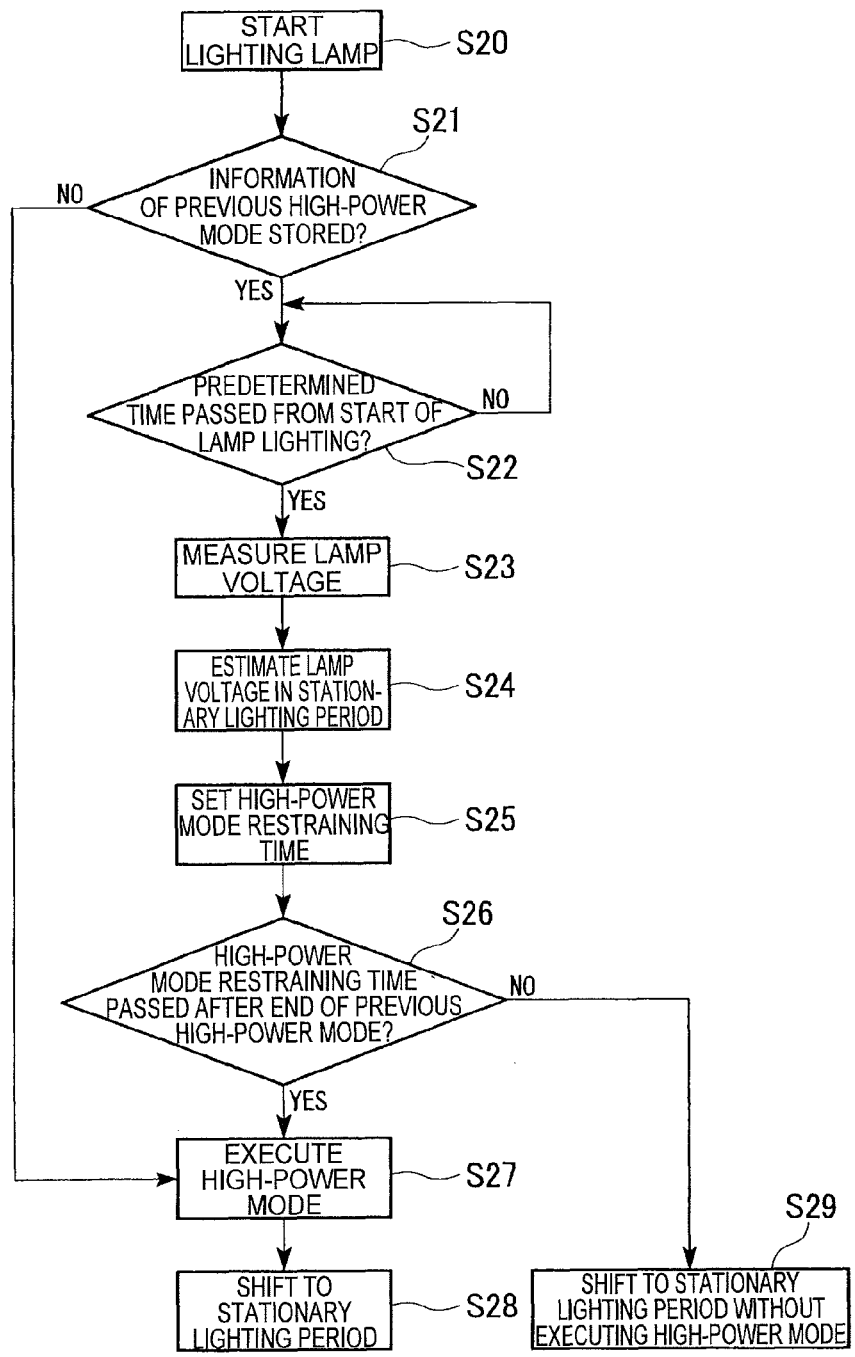
FIG. 11 is a flowchart showing an example of a control procedure for a discharge lamp driving unit by a control unit of a third embodiment.

FIG. 11 is a flowchart showing the control procedure for the discharge lamp driving unit 230 by the control unit 40 in this embodiment.

As shown in FIG. 11, the lighting of the discharge lamp 90 is started (Step S20), and the control unit 40 determines whether first information about the previous high-power mode is stored in the storage unit 44 or not (Step S21), as in the second embodiment.

If the first information is stored in the storage unit 44 (Step S21: YES), the control unit 40 then determines whether a predetermined time has passed from the start of the lighting of the lamp or not (Step S22). The predetermined time is the time from the start of the lighting of the lamp to when the lamp voltage is referred to, that is, to the time Ta in FIG. 9. The value of the time Ta is stored, for example, in the storage unit 44 in advance.

If the first information is not stored in the storage unit 44 (Step S21: NO), the control unit 40 shifts the processing to Step S27, where the high-power mode is executed, as in the second embodiment.

If the predetermined time has passed from the start of the lighting of the lamp (Step S22: YES), the control unit 40 detects the lamp voltage (second information), for example, at the time Ta (Step S23). Here, as described in the first embodiment, since the lamp voltage referred to at the time Ta is different from the lamp voltage in the stationary lighting period PH2, the designer of the projector prepares, in advance, a conversion formula to find the lamp voltage in the stationary lighting period PH2 from the lamp voltage value at the time Ta, or a conversion table based on statistical values of voltage transition that are actually measured with plural discharge lamps, and stores the conversion formula or conversion table in the storage unit 44 in advance. An example of the conversion table is shown in Table 5.

Table 5 shows the relation with the high-power mode restraining time, in addition to the relation between the lamp voltage value at the time Ta and the lamp voltage in the stationary lighting period PH2.

TABLE 5

| Lamp Voltage (V) at Time Ta | Lamp Voltage (V) in Stationary Lighting Period | High-Power Mode Restraining Time (h) |
|---|---|---|
| To 24 | To 75 | 1 |
| 25 to 28 | 76 to 80 | 2 |
| 29 to 32 | 81 to 90 | 5 |
| 33 to 36 | 91 to 100 | 8 |
| 37 to 40 | 101 to 120 | 12 |
| 41 and above | 121 and above | 20 |

In the lookup table shown in Table 5, the high-power mode restraining time is set to be longer according to the degree of deterioration of the discharge lamp 90 at a predetermined setting timing (time Ta), that is, as the lamp voltage increases, as in the second embodiment.

The control unit 40 estimates the lamp voltage in the stationary lighting period PH2 (second information) on the basis of the lamp voltage detected at the time Ta and Table 5 (Step S24). The control unit 40 then sets the high-power mode restraining time on the basis of the estimated lamp voltage value (Step S25). After that, as in the first embodiment, the control unit 40 determines whether the high-power mode restraining time has passed from the time point when the previous high-power mode is ended, or not (Step S26). If the high-power mode restraining time has passed (Step S26: YES), the control unit 40 executes the high-power mode (Step S27) and subsequently shifts the lighting period to the stationary lighting period PH2 (Step S28). If the high-power mode restraining time has not passed (Step S26: NO), the control unit 40 shifts the lighting period to the stationary lighting period PH2 without executing the high-power mode (Step S29).

In this embodiment, Steps S21 to S26 are equivalent to the setting timing for setting the first execution information of the high-power mode. Also, Steps S22 to S24 are steps of acquiring the second information about the lighting state of the discharge lamp 90. In this embodiment, the second information is the lamp voltage of the discharge lamp 90 at the setting timing, and more specifically, the lamp voltage of the discharge lamp 90 at the time Ta.

According to this embodiment, the first execution information of the high-power mode can be set more appropriately. Details will be described hereinafter.

In the second embodiment, since the lamp voltage in the previous high-power mode is used as the information for acquiring the deterioration state of the discharge lamp 90, the lookup table of Table 4 is set according to the deterioration of the discharge lamp 90 during the period from the previous high-power mode to the next setting timing, that is, according to the increase in the lamp voltage. However, if the time of use after the previous high-power mode is long, the deterioration of the discharge lamp 90 may proceed more than expected and the first execution information of the high-power mode, for example, the high-power mode restraining time cannot be set appropriately in some cases.

In contrast, according to this embodiment, second information about the lighting state of the discharge lamp 90 is acquired at the setting timing for setting the first execution information of the high-power mode, and the first execution information of the high-power mode is set on the basis of the second information. Therefore, according to the embodiment, the deterioration state of the discharge lamp 90 can be acquired more accurately and the first execution information of the high-power mode can be set more appropriately.

In this embodiment, the following configuration may also be employed.

In the embodiment, the cumulative lighting time of the discharge lamp 90 may be used as the second information. In this case, the deterioration state of the discharge lamp 90 can be grasped on the basis of the time of actual use (cumulative lighting time) of the discharge lamp 90.

Also, in the embodiment, the first execution information of the high-power mode may be set, using plural pieces of second information. Specifically, the high-power mode restraining time may be set, using the lamp voltage at the setting timing and the cumulative lighting time of the discharge lamp 90 at the setting timing.

Moreover, in the embodiment, the first execution information of the high-power mode may be set, using the first information and the second information. Specifically, the high-power mode restraining time may be set, using the lamp voltage at the setting timing and the refresh power Wr in the previous high-power mode.

Fourth Embodiment

A fourth embodiment is different from the second embodiment in that the high-power mode restraining time is set on the basis of third information about the lighting mode executed during the period from the end of the high-power mode to the next setting timing.

In the description below, the similar configurations to those of the foregoing embodiments may be denoted by the same reference numerals as needed and not described further in detail.

In this embodiment, the third information about the lighting mode executed during the period from the end of the high-power mode to the next setting timing is stored in the storage unit 44, in addition to the first information about the high-power mode. The timing when the third information is stored in the storage unit 44 is, for example, immediately before the power of the projector 500 is turned off in the case where the high-power mode is provided in the launching period PH1.

The third information includes all the information associated with the lighting mode executed during the period from the end of the high-power mode to the next setting timing. In the description below, the lighting mode executed during the period from the end of the high-power mode to the next setting timing is referred to as an immediately preceding lighting mode.

The third information may be, for example, the lamp voltage of the discharge lamp 90 in the immediately preceding lighting mode, that is, the lamp voltage at the time of the previous lighting of the discharge lamp as described in the first embodiment, the drive power W, the execution time and the like.

The immediately preceding lighting mode may include various lighting modes set in the projector 500, for example, a stationary lighting mode, a high-power mode, a low-power mode, a dimming mode, and a standby mode or the like.

Figure 12:
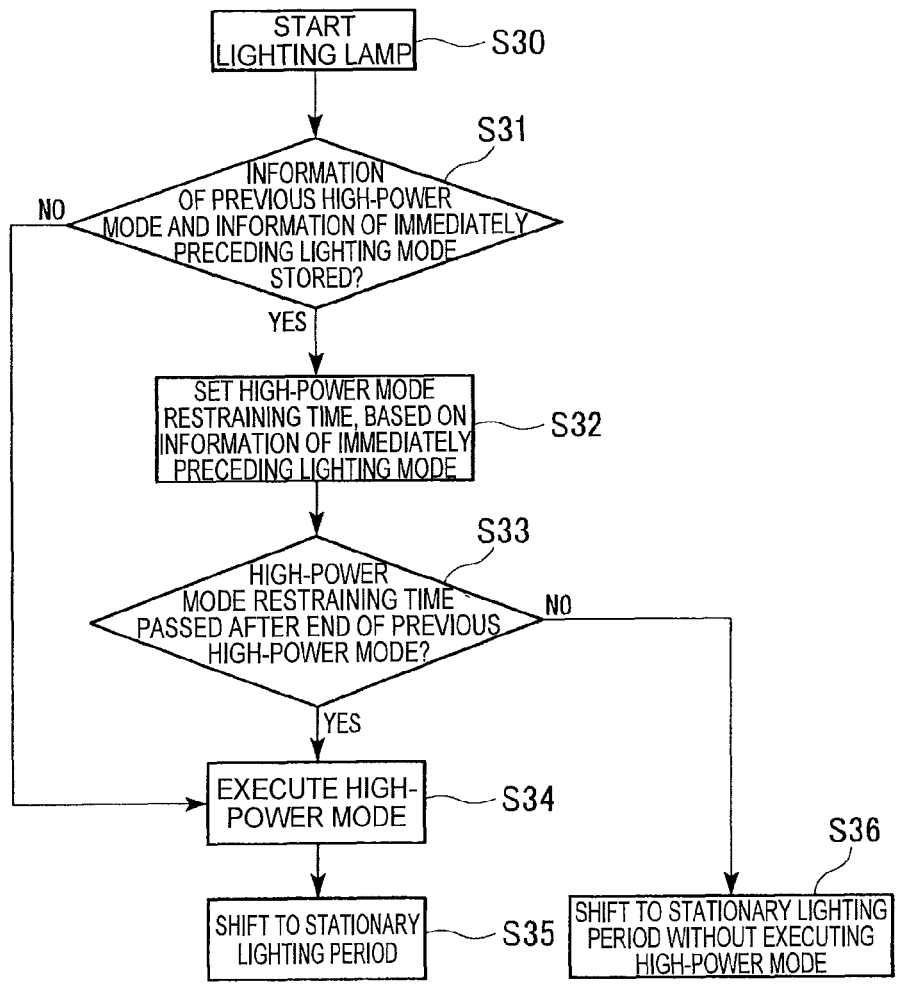
FIG. 12 is a flowchart showing an example of a control procedure for a discharge lamp driving unit by a control unit of a fourth embodiment.

FIG. 12 is a flowchart showing the control procedure for the discharge lamp driving unit 230 by the control unit 40 according to this embodiment.

As shown in FIG. 12, as the lighting of the discharge lamp 90 is started (Step S30), the control unit 40 determines whether first information about the previous high-power mode and third information about the immediately preceding lighting mode are stored in the storage unit 44 or not (Step S31).

If the first information and the third information are stored in the storage unit 44 (Step S31: YES), first, the high-power mode restraining time is set on the basis of the third information (Step S32). The high-power mode restraining time is set, for example, using a lookup table showing the relation between the third information and the high-power mode restraining time. This lookup table is stored in the storage unit 44. In this embodiment, for example, the drive power in the immediately preceding lighting mode is used as the third information. A specific example of the lookup table in this embodiment is shown in Table 6.

TABLE 6

| Drive Power (W) in Immediately Preceding Lighting Mode | High-Power Mode Restraining Time (h) |
|---|---|
| 120 | 5 |
| 140 | 2 |
| 160 | 1 |
| 200 | 0 |

As shown in Table 6, the high-power mode restraining time is set to be shorter as the drive power in the immediately preceding lighting mode increases. This is because the protrusion 552p of the first electrode 92 grows more quickly as the drive power in the lighting mode that is set after the high-power mode increase. In the example shown in Table 6, the refresh power Wr in the high-power mode is set, for example, to 200 W.

Here, the case where the stationary lighting power Ws is 200 W, shown in Table 6, is the case where the immediately preceding lighting mode is the high-power mode. In this case, since the discharge lamp 90 in the stationary state is driven in the high-power mode with the drive power W of 200 W, the high-power mode restraining time is set to 0 h.

Meanwhile, if the first information and the third information are not stored in the storage unit 44 (Step S31: NO), the control unit 40 shifts the processing to Step S34, where the high-power mode is executed, as in the second embodiment.

After setting the high-power mode restraining time, the control unit 40 determines whether the high-power mode restraining time has passed from the time point when the previous high-power mode is ended, or not (Step S33), as in the second embodiment. If the high-power mode restraining time has passed (Step S33: YES), the control unit 40 executes the high-power mode (Step S34) and subsequently shifts the lighting period to the stationary lighting period PH2 (step S35). If the high-power mode restraining time has not passed (Step S33: NO), the control unit 40 shifts the lighting period to the stationary lighting period PH2 without executing the high-power mode (Step S36).

In this embodiment, Steps S31 to S33 are equivalent to the setting timing for setting the first execution information of the high-power mode.

According to this embodiment, since the high-power mode restraining time is set on the basis of the third information about the immediately preceding lighting mode, the degree of growth of the protrusion 552p after the execution of the previous high-power mode can be grasped more accurately. Therefore, according to the embodiment, the first execution information of the high-power mode can be set more appropriately.

In the embodiment, the following configuration may also be employed.

In the above embodiment, the timing for storing the third information is immediately before the power of the projector 500 is turned off. However, this example is not limiting. In the embodiment, the third information may be constantly stored in the storage unit 44, for example, during the entire period when the immediately preceding lighting mode is executed.

Also, in the embodiment, the first execution information of the high-power mode may be set, using plural pieces of third information. Specifically, the high-power mode restraining time may be set, for example, using the drive power W in the immediately preceding lighting mode and the execution time of the immediately preceding lighting mode.

Fifth Embodiment

A fifth embodiment is different from the third embodiment in that a drive parameter is set as the first execution information of the high-power mode.

In the description below, the similar configurations to those of the foregoing embodiments may be denoted by the same reference numerals as needed and not described further in detail.

In this embodiment, the high-power mode is executed in the launching period PH1 regardless of the content of the first information, in contrast to the second to fourth embodiments.

Figure 13:
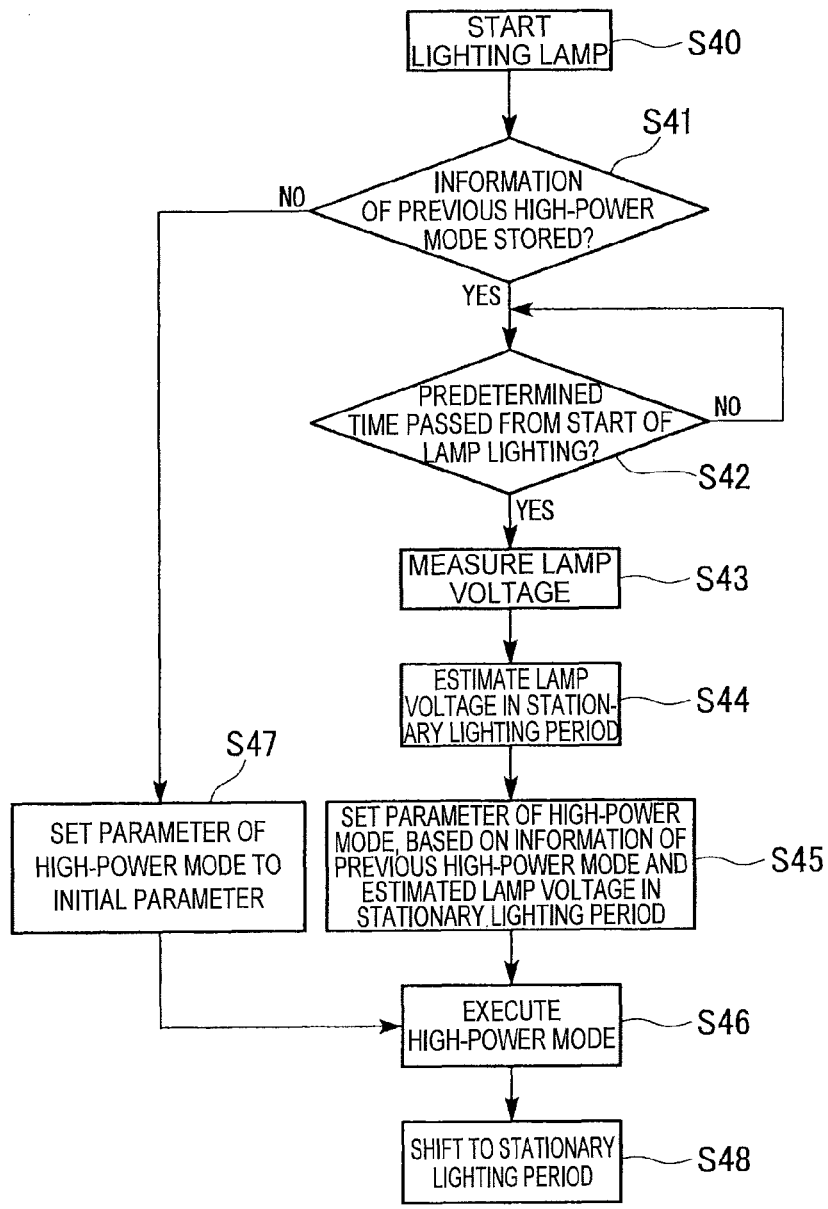
FIG. 13 is a flowchart showing an example of a control procedure for a discharge lamp driving unit by a control unit of a fifth embodiment.

FIG. 13 is a flowchart showing the control procedure for the discharge lamp driving unit 230 by the control unit 40 according to this embodiment.

As shown in FIG. 13, as the lighting of the discharge lamp 90 is started (Step S40), the control unit 40 determines whether first information about the previous high-power mode is stored in the storage unit 44 or not (Step S41), as in the second embodiment. If the first information is stored in the storage unit 44 (Step S41: YES), the control unit 40 then determines whether a predetermined time has passed from the start of the lighting of the lamp or not (Step S42).

Meanwhile, if the first information is not stored in the storage unit 44 (Step S41: NO), the control unit 40 sets the drive parameter of the high-power mode to an initial parameter (Step S47) and executes the high-power mode (Step S46).

If the predetermined time has passed from the start of the lighting of the lamp (Step S42: YES), the control unit 40 detects the lamp voltage (second information) at the time Ta (Step S43) and estimates the lamp voltage (second information) in the stationary lighting period PH2, for example, using the conversion table shown as an example in Table 5 (Step S44).

Next, the first execution information of the high-power mode is set on the basis of the first information of the previous high-power mode and the estimated lamp voltage in the stationary lighting period PH2 (Step S45). In this embodiment, the first information is, for example, the lighting time of the discharge lamp 90 after the execution of the previous high-power mode.

The first execution information of the high-power mode is, for example, the refresh power Wr (drive parameter) in the high-power mode. The refresh power Wr is set, for example, using a lookup table showing the relation between the lighting time after the execution of the previous high-power mode, the estimated lamp voltage in the stationary lighting period PH2, and the refresh power Wr in the high-power mode to be set. A specific example of the lookup table in this embodiment is shown in Table 7.

TABLE 7

| Drive Power (W) in | | Lighting Time (h) after Execution Of Previous High-Power Mode | | | | | |
|---|---|---|---|---|---|---|---|
| | | 0 to 0.5 | 0.5 to 1 | 1 to 2 | 2 to 5 | 5 to 10 | 10 and above |
| High-Power Mode (Refresh Power Wr) | | | | | | | |
| Lamp Voltage (V) In Stationary Lighting Period | To 75 | 145 | 145 | 145 | 160 | 160 | 160 |
| | 76 to 100 | 145 | 160 | 200 | 200 | 200 | 200 |
| | 101 and above | 160 | 160 | 160 | 160 | 160 | 200 |

As shown in Table 7, the refresh power Wr in the high-power mode to be set is set to be higher as the lamp voltage value increase (that is, the degree of deterioration of the discharge lamp 90 is higher) and as the lighting time after the execution of the previous high-power mode becomes longer.

If the lamp voltage value is high, the drive current I flowing between the electrodes is low and therefore the protrusion 552p of the first electrode 92 does not easily melt. Therefore, the degree of melting of the protrusion 552p in the previous high-power mode is low. Thus, setting the drive power in the high-power mode to be high enables the protrusion 552p to melt properly.

Meanwhile, the protrusion 552p of the first electrode 92 grows more easily as the lighting time after the execution of the previous high-power mode is longer. Therefore, even if the drive power in the high-power mode is set to be high, the excessive melting of the protrusion 552p can be restrained.

The control unit 40 sets the refresh power Wr in the high-power mode as described above and executes the high-power mode (Step S46). After that, the control unit 40 shifts the lighting period to the stationary lighting period PH2 (Step S48).

According to this embodiment, the drive parameter of the high-power mode is set on the basis of the first information in the previous high-power mode and the second information. Therefore, the melting effect of the protrusion 552p of the first electrode 92 in the high-power mode to be executed can be adjusted according to the degree of growth of the protrusion 552p at the time of executing the high-power mode. Thus, according to the embodiment, the excessive melting of the protrusion 552p can be restrained and the expansion of the distance between the electrodes of the discharge lamp 90 can be restrained.

In the embodiment, the following configuration may also be employed.

In the embodiment, the first execution information of the high-power mode may be set, using three or more pieces of information selected from the first information and the second information. Specifically, the drive parameter of the high-power mode, for example, the refresh power Wr may be set, for example, on the basis of the refresh power Wr in the previous high-power mode, and the lamp voltage and the cumulative lighting time at the setting timing.

Also, in the embodiment, as the drive parameter of the high-power mode, other values than the refresh power Wr, for example, the drive current waveform or the execution time of the high-power mode may be set. The drive current waveform and the execution time of the high-power mode will be described respectively below.

First, the case where the drive current waveform is used as the drive parameter will be described.

Figure 14:
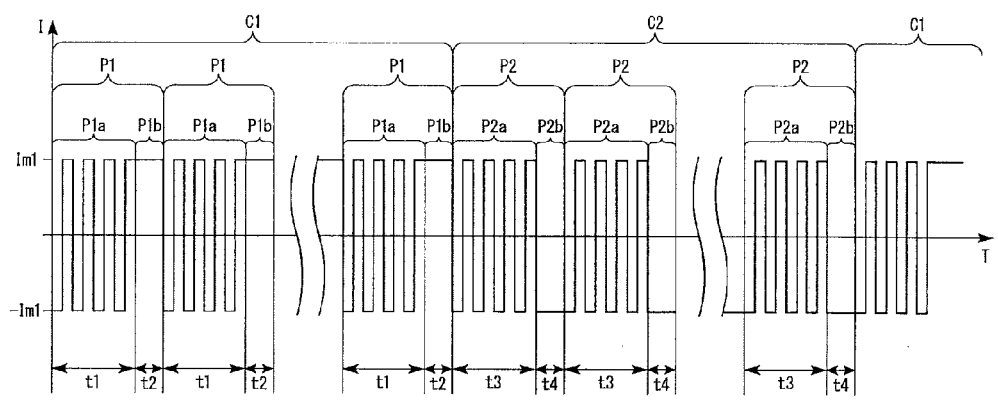
FIG. 14 shows an example of a drive current waveform in a high-power mode according to the fifth embodiment.

FIG. 14 shows an example of the drive current waveform in the high-power mode. The vertical axis represents drive current I and the horizontal axis represents time T.

As shown in FIG. 14, a cycle C1 and a cycle C2 are alternately provided in the drive current waveform of this embodiment.

The cycle C1 includes plural mixture periods P1. A mixture period P1 includes an AC period P1a and a DC period P1b.

The AC period P1a is a period in which an alternating current with the polarity thereof inverted between a current value Im1 and a current value −Im1 is supplied to the discharge lamp 90 as the drive current I. In this embodiment, the alternating current in the AC period P1a is a square wave alternating current. The DC period P1b is a period in which a direct current with the current value Im1 is supplied to the discharge lamp 90 as the drive current I. In this embodiment, the direct current in the DC period P1b is a direct current having a first polarity with a constant current value (Im1).

The cycle C2 includes plural mixture periods P2. A mixture period P2 includes an AC period P2a and a DC period P2b.

The AC period P2a is similar to the AC period P1a of the cycle C1. The DC period P2b is a period in which a direct current with the current value −Im1 is supplied to the discharge lamp 90 as the drive current I. In this embodiment, the direct current in the DC period P2b is a direct current having a second polarity with a constant current value (−Im1).

An example of a lookup table used to set the drive current waveform in the high-power mode is shown in Table 8.

TABLE 8

| Drive Current Waveform in High-Power Mode | | Lighting Time (h) after Execution Of Previous High-Power Mode | | | | | |
|---|---|---|---|---|---|---|---|
| | | 0 to 0.5 | 0.5 to 1 | 1 to 2 | 2 to 5 | 5 to 10 | 10 and above |
| Lamp Voltage (V) In Stationary Lighting Period | To 75 | A | A | A | B | B | B |
| | 76 to 100 | A | B | C | C | C | C |
| | 101 and above | B | B | B | B | B | C |

As shown in Table 8, the drive current waveform in the high-power mode is set to one of waveforms A, B and C, according to the lighting time after the execution of the previous high-power mode and the estimated lamp voltage in the stationary lighting period PH2. Parameters of each of the waveforms A to C are shown in Table 9.

TABLE 9

| | Frequency of AC Periods P1a, P2a (Hz) | Lengths t1, t3 of AC Periods P1a, P2a (periods) | Lengths t2, t4 of DC Periods P1b, P2b (ms) | Number of Mixture Periods P1, P2 Included in Cycles C1, C2 |
|---|---|---|---|---|
| Waveform A | 500 | 15 | 2 | 1 |
| Waveform B | 500 | 10 | 6 | 2 |
| Waveform C | 500 | 5 | 8 | 10 |

As shown in Table 9, the frequency of the AC periods P1a, P2a is 500 Hz in all of the waveforms A to C.

The lengths t1, t3 of the AC periods P1a, P2a in the waveform A are equivalent to 15 periods each. The lengths t2, t4 of the DC periods P1b, P2b in the waveform A are 2 ms (milliseconds) each. The number of the mixture periods P1, P2 included in the cycles C1, C2 in the waveform A is 1.

The lengths t1, t3 of the AC periods P1a, P2a in the waveform B are equivalent to 10 periods each. The lengths t2, t4 of the DC periods P1b, P2b in the waveform B are 6 ms each. The number of the mixture periods P1, P2 included in the cycles C1, C2 in the waveform B is 2.

The lengths t1, t3 of the AC periods P1a, P2a in the waveform C are equivalent to 5 periods each. The lengths t2, t4 of the DC periods P1b, P2b in the waveform C are 8 ms each. The number of the mixture periods P1, P2 included in the cycles C1, C2 in the waveform C is 10.

The effect of melting the protrusion 552p of the first electrode 92, exerted by the waveforms A, B, and C, increase in this order. That is, the effect of melting the protrusion 552p becomes higher as the lengths t1, t3 of the AC periods P1a, P2a become shorter. Also, the effect of melting the protrusion 552p becomes higher as the lengths t2, t4 of the DC periods P1b, P2b become longer. Moreover, the effect of melting the protrusion 552p becomes higher as the number of the mixture periods P1, P2 included in the cycles C1, C2 becomes greater.

In the example shown in Table 9, the frequency of the AC periods P1a, P2a is set to the same value for the respective drive current waveforms. However, this frequency may be different among the drive current waveforms. The melting effect of the protrusion 552p becomes higher as the frequency of the AC periods P1a, P2a becomes lower.

Next, the case where the execution time is used as a drive parameter will be described.

Figure 15:
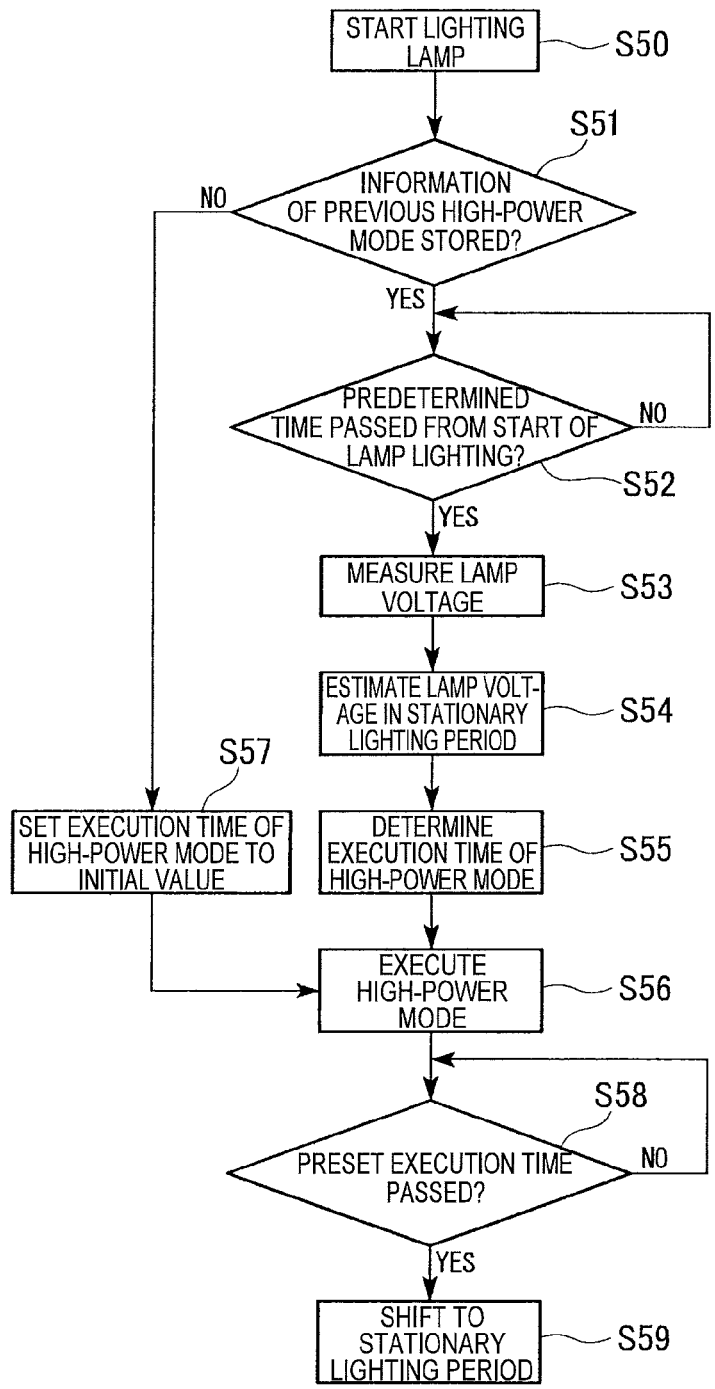
FIG. 15 is a flowchart showing another example of a control procedure for the discharge lamp driving unit by the control unit of the fifth embodiment.

FIG. 15 is a flowchart showing the control procedure for the discharge lamp driving unit 230 by the control unit 40 in the case where the execution time tr1 (see FIG. 9) of the high-power mode is set as a drive parameter of the high-power mode.

Steps S50 to S54 shown in FIG. 15 are similar to Steps S40 to S44 shown in FIG. 13.

After estimating the lamp voltage in the stationary lighting period PH2 (Step S54), the control unit 40 sets the execution time tr1 of the high-power mode on the basis of the lighting time after the execution of the previous high-power mode and the estimated lamp voltage in the stationary lighting period PH2 (Step S55). An example of a lookup table used to set the execution time tr1 of the high-power mode is shown in Table 10.

TABLE 10

| | | Lighting Time (h) after Execution Of Previous High-Power Mode | | | | | |
|---|---|---|---|---|---|---|---|
| Execution Time tr1 (s) of High-Power Mode | | 0 to 0.5 | 0.5 to 1 | 1 to 2 | 2 to 5 | 5 to 10 | 10 and above |
| Lamp Voltage (V) In Stationary Lighting Period | To 75 | 2 | 2 | 2 | 10 | 10 | 10 |
| | 76 to 100 | 2 | 10 | 60 | 60 | 60 | 60 |
| | 101 and above | 10 | 10 | 10 | 10 | 10 | 60 |

As shown in Table 10, the execution time of the high-power mode to be set is set to be longer as the lamp voltage increases, that is, as the degree of deterioration of the discharge lamp 90 becomes higher, or as the lighting time after the execution of the previous high-power mode is long.

The melting effect of the first electrode 92 becomes higher as the execution time of the high-power mode becomes longer.

After setting the execution time tr1 of the high-power mode, the control unit 40 executes the high-power mode (Step S56). The control unit 40 then determines whether the preset execution time tr1 has passed from the execution of the high-power mode or not (Step S58). If the preset execution time tr1 has passed (Step S58: YES), the control unit 40 shifts the lighting period to the stationary lighting period PH2 (Step S59). If the execution time tr1 has not passed (Step S58: NO), the control unit 40 continues executing the high-power mode until the execution time tr1 passes.

If the first information about the previous high-power mode is not stored in the storage unit 44 (Step S51 NO), the control unit 40 sets the execution time tr1 of the high-power mode to an initial value (Step S57) and executes the high-power mode (Step S56). The initial value of the execution time tr1 is stored, for example, in the storage unit 44 in advance.

Sixth Embodiment

A sixth embodiment is different from the second to fifth embodiments in that the high-power mode is executed in the stationary lighting period PH2.

In the description below, the similar configurations to those of the foregoing embodiments may be denoted by the same reference numerals as needed and not described further in detail.

Figure 16:
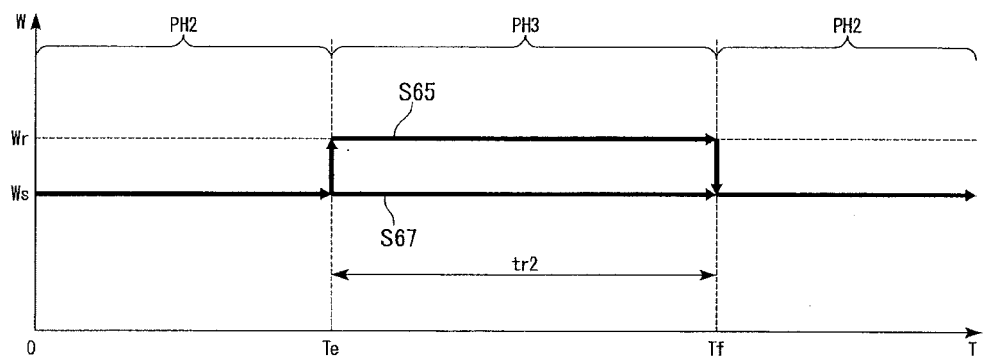
FIG. 16 shows an example of a drive power waveform according to a sixth embodiment.

FIG. 16 shows a waveform of drive power in this embodiment. In FIG. 16, the vertical axis represents drive power W and the horizontal axis represents time T. FIG. 16 shows the waveform of the drive power W after the launching period PH1 ends and shifts to the stationary lighting period PH2, in which the stationary lighting mode is executed.

In this embodiment, a high-power lighting period PH3 in which the high-power mode is executed is provided in the stationary lighting period PH2. FIG. 16 shows an example in which the high-power lighting period PH3 is provided from time Te to time Tf.

Figure 17:
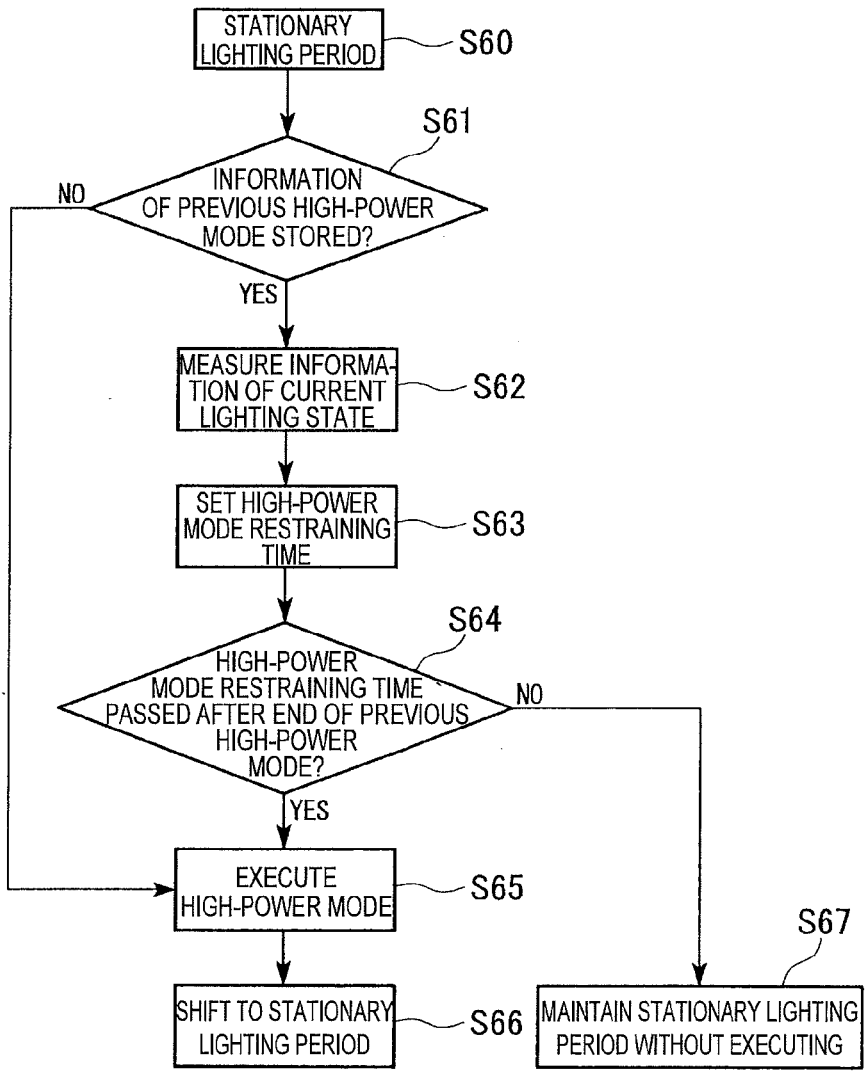
FIG. 17 is a flowchart showing an example of a control procedure for a discharge lamp driving unit by a control unit of the sixth embodiment.

FIG. 17 is a flowchart showing the control procedure for the discharge lamp driving unit 230 by the control unit 40 in this embodiment.

As shown in FIG. 17, first in the stationary lighting period PH2 (Step S60), the control unit 40 determines whether first information about the previous high-power mode is stored in the storage unit 44 or not (Step S61). If the first information is stored in the storage unit 44 (Step S61: YES), the control unit 40 measures the current lighting state, that is, second information about the lighting state in the stationary lighting period PH2 (Step S62). On the basis of the result of the measurement, the control unit 40 sets, for example, a high-power mode restraining time as first execution information of the high-power mode (Step S63).

After that, the control unit 40 determines whether the high-power mode restraining time has passed or not (Step S64), as in the second embodiment. If the high-power mode restraining time has passed (Step S64: YES), the control unit 40 executes the high-power mode (Step S65). That is, the control unit 40 shifts the lighting period from the stationary lighting period PH2 to the high-power lighting period PH3.

In the second to fifth embodiments, since the high-power mode is provided in the launching period PH1, even if the execution of the high-power mode is decided, the high-power mode is not immediately executed and is executed after the drive power W increases to the refresh power Wr.

In contrast to this, according to this embodiment, the high-power mode is provided in the stationary lighting period PH2, in which the stationary lighting mode is executed. Therefore, once the execution of the high-power mode is decided, the high-power mode can be executed immediately. In this embodiment, the high-power mode may be executed immediately after the execution is decided or may be executed after a predetermined interval.

After executing the high-power mode for an execution time tr2, the control unit 40 shifts the lighting period to the stationary lighting period PH2 again (Step S66). If the high-power mode restraining time has not passed (Step S64: NO), the control unit 40 maintains the stationary lighting period PH2 as it is, without executing the high-power mode (Step S67).

In this embodiment, Steps S61 to S64 are equivalent to the setting timing. In this embodiment, since the high-power mode is executed in the stationary lighting period PH2, in which the stationary lighting mode is executed, the setting timing is provided in the stationary lighting period PH2.

The setting timing in this embodiment may be provided, for example, every time a predetermined lighting time passes, or may be provided constantly during the stationary lighting period PH2.

In the case where the setting timing is provided every time a predetermined lighting time passes, the position where the setting timing is provided may be adjusted according to the trend of change in the lighting state of the discharge lamp 90.

In the case where the setting timing is provided constantly during the stationary lighting period PH2, second information about the lighting state of the discharge lamp 90 in the stationary lighting period PH2 is acquired constantly, and the high-power mode is suitably executed on the basis of the second information and the first information about the previous high-power mode.

According to this embodiment, since the high-power mode is executed in the stationary lighting period PH2, the setting timing is provided in the stationary lighting period PH2. Therefore, lighting information in the stationary lighting period PH2 is easily acquired as the second information about the lighting state of the discharge lamp 90 at the setting timing. Thus, according to the embodiment, the lighting state and the degree of deterioration of the discharge lamp 90 can be grasped accurately and the first execution information of the high-power mode can be set more appropriately.

In the embodiment, the following configuration may also be employed.

In the embodiment, the light emitted from the discharge lamp 90 may be adjusted in the high-power lighting period PH3, in which the high-power mode is executed. Thus, change in intensity of image light projected from the projector 500 in the stationary lighting period PH2 and in the high-power lighting period PH3 can be restrained and flickering can be restrained.

Also, while the high-power mode restraining time and whether to execute the high-power mode or not are set as the first execution information of the high-power mode in the above embodiment, this example is not limiting. In the embodiment, any of the first execution information in the second to fifth embodiments may be set.

Moreover, while the lighting time after the end of the previous high-power mode is used as the first information of the previous high-power mode in the above embodiment, this example is not limiting. In the embodiment, any of the first information in the second to fifth embodiments may be set.

Furthermore, in the embodiment, the control unit 40 may set the first execution information of the high-power mode, only on the basis of the first information and without using the second information.

The second to sixth embodiments describe the cases where either whether to execute the high-power mode or not (high-power mode restraining time) or the drive parameter of the high-power mode is selected as the first execution information. However, these examples are not limiting. According to another embodiment of the invention, both whether to execute the high-power mode or not and the drive parameter of the high-power mode may be used as the first execution information of the high-power mode. In this case, for example, the control unit 40 decides whether to execute the high-power mode or not, on the basis of various kinds of information, and if the high-power mode is to be executed, the control unit 40 sets the drive parameter of the high-power mode.

Seventh Embodiment

A seventh embodiment is different from the first embodiment in that a protrusion forming period PH4 is provided.

In the description below, the similar configurations to those of the foregoing embodiments may be denoted by the same reference numerals as needed and not described further in detail.

In this embodiment, the control unit 40 is capable of executing a stationary lighting mode, a high-power mode, and a protrusion forming mode (protrusion forming driving) in which the growth of the protrusion 552p of the first electrode 92 is facilitated.

The term "protrusion forming mode" used herein means a lighting mode in which driving to facilitate the growth of the protrusion 552p more than in the high-power mode or in the stationary lighting mode is executed.

In this embodiment, the frequency of an alternating current supplied to the discharge lamp 90 in the protrusion forming mode is set to a frequency that facilitates the growth of the protrusion 552p, and the proportion of the period during which the alternating current is supplied to the discharge lamp 90 is increased, thus facilitating the growth of the protrusion 552p in the protrusion forming mode.

In the embodiment, second execution information of the protrusion forming mode corresponding to first information about the high-power mode, and a lookup table, arithmetic formula or the like for acquiring the second execution information of the protrusion forming mode from the first information about the high-power mode are stored in the storage unit 44.

The second execution information of the protrusion forming mode includes all the necessary information for executing the protrusion forming mode. The second execution information may be, for example, the waveform of the drive current I, the frequency of the drive current, the drive power, the execution time and the like, in the protrusion forming mode.

In this description, the second execution information is the execution information of the protrusion forming mode.

In this embodiment, the system controller 41 (control unit 40) sets the second execution information of the protrusion forming mode according to the first information about the high-power mode stored in the storage unit 44 and thus controls the drive current I.

Next, the control of the drive power supplied to the discharge lamp 90 in the embodiment will be described.

Figure 18:
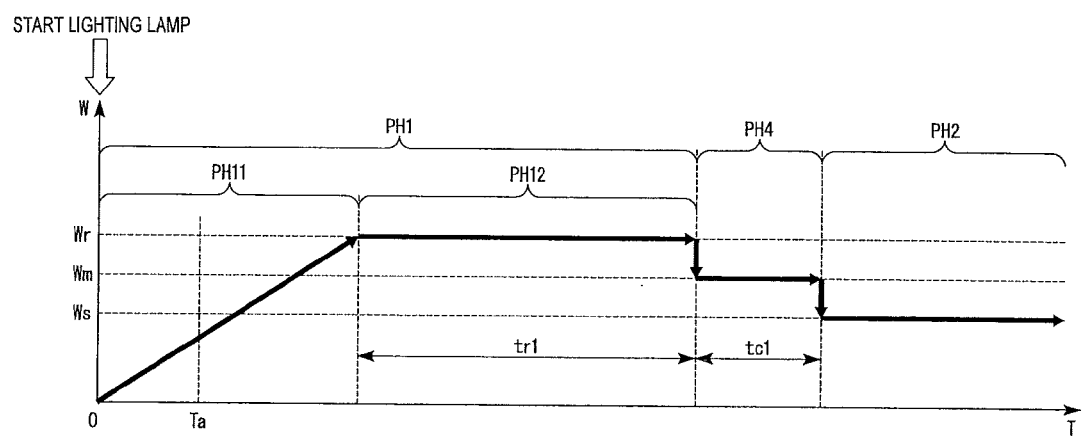
FIG. 18 shows an example of a drive power waveform according to a seventh embodiment.

FIG. 18 shows a waveform of the drive power in this embodiment. In FIG. 18, the vertical axis represents drive power W and the horizontal axis represents time T. FIG. 18 shows change in the drive power W during a period from the time point when the discharge lamp 90 is lit to when the stationary lighting state begins.

As shown in FIG. 18, in this embodiment, the protrusion forming period PH4 is provided between the launching period PH1 and the stationary lighting period PH2.

The protrusion forming period PH4 is a period in which the protrusion forming mode is executed. In the protrusion forming period PH4 of this embodiment, the drive power W is protrusion forming power (third drive power) Wm that is lower than the refresh power Wr and higher than the stationary lighting power Ws. In the embodiment, the value of the drive power W in the protrusion forming period PH4 is constant (Wm).

In the embodiment, the length of the protrusion forming period PH4, that is, an execution time tc1 of the protrusion forming mode is determined according to the first information about the high-power mode. Details thereof will be described below.

The stationary lighting period PH2 is a period in which the stationary lighting mode where the stationary lighting power (first drive power) Ws is supplied to the discharge lamp 90 is executed. The stationary lighting power Ws is lower than the refresh power Wr in the second launching period PH12.

The refresh power Wr, that is, the drive power W in the high-power mode is, for example, 200 W. The stationary lighting power Ws is, for example, 140 W.

The refresh power Wr may be set according to the value of the lamp voltage of the discharge lamp 90 detected by the operation detection unit 60, as in the second embodiment. Specifically, the refresh power Wr can be set, for example, as shown in Table 3 described in the second embodiment.

In this embodiment, the high-power mode, the protrusion forming mode, and the stationary lighting mode are executed in this order. That is, in this embodiment, the protrusion forming mode (protrusion forming period PH4) is executed after the high-power mode (second launching period PH12) is executed and before the stationary lighting mode (stationary lighting period PH2) is executed.

Next, the control of the drive current I supplied to the discharge lamp 90 in the respective periods in the embodiment, that is, in the launching period PH1, the protrusion forming period PH4 and the stationary lighting period PH2 will be described.

The waveform of the drive current I in the respective periods in this embodiment can be formed similarly to the waveform of the drive current I shown in FIG. 14 in the fifth embodiment.

In this embodiment, the frequency of the drive current I in the AC period P1a shown in FIG. 14 is set to a frequency that enables the protrusion 552p to grow easily. A preferable frequency to facilitate the formation of the protrusion 552p may be, for example, 100 Hz or above and 1000 Hz or below.

In this embodiment, the proportion of the AC periods P1a, P2a to the protrusion forming period PH4 shown in FIG. 18 is set to be higher than the proportion of the AC periods P1a, P2a to the second launching period PH12. In other words, the proportion of the time when an alternating current is supplied to the execution time tc1 of the protrusion forming mode is higher than the proportion of the time when an alternating current is supplied to the execution time tr1 of the high-power mode.

In this embodiment, the proportion of the AC periods P1a, P2a to the protrusion forming period PH4 is set to be higher than the proportion of the AC periods P1a, P2a to the stationary lighting period PH2. In other words, the proportion of the time when an alternating current is supplied to the execution time tc1 of the protrusion forming mode is higher than the proportion of the time when an alternating current is supplied to the execution time of the stationary lighting mode.

The lengths t1, t3 of the AC periods P1a, P2a and the lengths t2, t4 of the DC periods P1b, P2b shown in FIG. 14 are respectively set according to the proportion of the AC periods P1a, P2a to the mixture periods P1, P2.

Next, the control of the discharge lamp driving unit 230 by the control unit 40 of this embodiment will be described.

Figure 19:
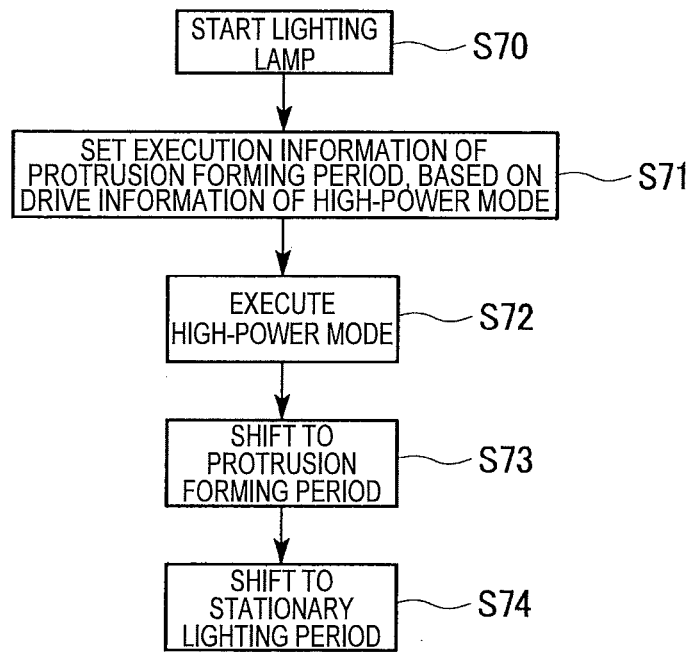
FIG. 19 is a flowchart showing an example of a control procedure for a discharge lamp driving unit by a control unit of the seventh embodiment.

FIG. 19 is a flowchart showing an example of the control procedure for the discharge lamp driving unit 230 by the control unit 40 of this embodiment.

As shown in FIG. 19, as the lighting of the discharge lamp 90 is started (Step S70), the control unit 40, in the first launching period PH11, refers to the first information about the high-power mode stored in the storage unit 44 and sets the second execution information of the protrusion forming period PH4 (protrusion forming mode) on the basis of the first information (Step S71).

In the embodiment, for example, the refresh power Wr and a drive refresh effect are used as the first information of the high-power mode.

In the embodiment, the execution time tc1 is set as the second execution information of the protrusion forming mode.

The term "drive refresh effect" used herein refers to the magnitude of the heat load applied to the protrusion 552p of the first electrode 92 by the driving in the high-power mode. For example, adjusting the waveform of the drive current I supplied to the discharge lamp 90 at the time of the high-power mode enables adjustment of the magnitude of the drive refresh effect. As the drive refresh effect becomes higher, the protrusion 552p melts more easily in the second launching period PH12, in which the high-power mode is executed.

The drive refresh effect is decided according to the heat load based at least on the execution time tr1 and the drive current waveform in the high-power mode. As the execution time tr1 becomes longer, the heat load applied to the protrusion 552p becomes greater. Also, for example, in the drive current waveform shown in FIG. 14, as the proportion of the DC periods P1b, P2b to the execution time tr1 of the high-power mode becomes higher, the heat load applied to the protrusion 552p becomes greater. The drive refresh effect become higher as the heat load due to the execution time tr1 combined with the heat load due to the drive current waveform becomes greater.

An indicator of the magnitude of the drive refresh effect can be, for example, the growth time that is taken for the protrusion 552p melted by the high-power mode in which predetermined refresh power Wr is set, to grow to the same extent as before the melting, when the stationary lighting mode is executed. In the description below, this growth time may be referred to simply as the growth time of the protrusion 552p.

The control unit 40 sets the execution time tc1 of the protrusion forming mode on the basis of the refresh power Wr and the drive refresh effect, which are the first information of the high-power mode. In this embodiment, the execution time tc1 is set, for example, using a lookup table showing the relation between the refresh power Wr and the drive refresh effect. A specific example of the lookup table in this embodiment is shown in Table 11. The stationary lighting power Ws in the stationary lighting mode in this case is, for example, 140 W.

TABLE 11

| Length of Protrusion Forming Period (s) | | Drive Refresh Effect | | |
|---|---|---|---|---|
| | | High | Medium | Low |
| Refresh Power Wr (W) | 141 to 169 | 10 | 5 | 0 |
| | 170 to 189 | 20 | 10 | 5 |
| | 190 to 200 | 30 | 15 | 10 |

In Table 11, the "high", "medium", and "low" indicating the degrees of the drive refresh effect use the growth time of the protrusion 552p as an indicator, for example. That is, if the degree of the drive refresh effect is high, the growth time is long. If the degree of the drive refresh effect is low, the growth time is short. If the degree of the drive refresh effect is medium, the growth time is intermediate.

As shown in Table 11, the execution time tc1 of the protrusion forming mode is set to be longer as the drive refresh effect becomes higher and as the refresh power Wr increases. This is because as the drive refresh effect and the refresh power Wr become higher, the protrusion 552p melts to a greater extent and therefore the protrusion 552p needs to grow more.

For example, setting the execution time tc1 of the protrusion forming mode as shown in Table 11 enables the protrusion 552p to grow sufficiently in the protrusion forming period PH4.

Next, as shown in FIG. 19, the control unit 40 executes the high-power mode on the basis of the first information of the high-power mode stored in the storage unit 44 (Step S72) and subsequently shifts the lighting period to the protrusion forming period PH4 (Step S73).

In the protrusion forming period PH4, the protrusion forming mode is executed on the basis of the second execution information that is set. At the time point when the execution time tc1 has passed, the control unit 40 shifts the lighting period to the stationary lighting period PH2 (Step S74).

In this manner, the control unit 40 controls the discharge lamp driving unit 230.

The control of the discharge lamp driving unit 230 by the control unit 40 can also be expressed as a discharge lamp driving method. That is, the discharge lamp driving method of this embodiment includes a stationary lighting mode in which the stationary lighting power Ws is supplied to the discharge lamp 90, a high-power mode in which the refresh power Wr higher than the stationary lighting power Ws is supplied to the discharge lamp 90, and a protrusion forming mode in which the growth of the protrusion 552p formed at the distal end of the first electrode 92 is facilitated. In the method, the protrusion forming mode is executed after the high-power mode is executed and before the stationary lighting mode is executed.

According to this embodiment, the protrusion forming period PH4 is provided and the protrusion forming mode is executed. Therefore, the execution of the stationary lighting mode in the state where the protrusion 552p is flattened can be restrained and consequently the flickering of the discharge lamp 90 can be restrained. Details thereof will be described below.

Figure 20A:
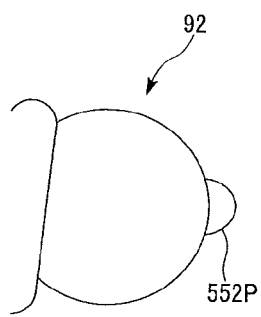
FIGS. 20A to 20C show melting states of distal ends of electrodes of a discharge lamp.
Figure 20B:
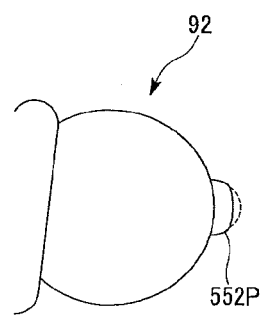
Figure 20C:
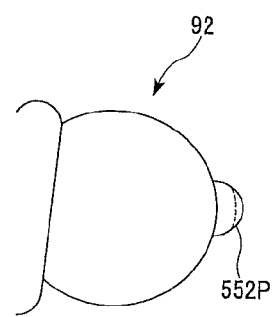

FIGS. 20A to 20C show melting states of the protrusion 552p of the first electrode 92. FIG. 20A shows the state before the protrusion 552p is melted. FIG. 20B shows the state in which the protrusion 552p is melted in the high-power mode. FIG. 20C shows the state where the melted protrusion 552p has grown in the protrusion forming mode. The dashed line in FIG. 20B shows the shape of the protrusion 552p in FIG. 20A. The dashed line in FIG. 20C shows the shape of the protrusion 552p in FIG. 20B.

As shown in FIG. 20A, the protrusion 552p before melting has a shape with a pointed tip. In this case, the position of the bright point of discharge is stabilized at the tip of the protrusion 552p.

Meanwhile, as the protrusion 552p is melted in the high-power mode, as shown in FIG. 20B, the protrusion 552p is flattened and the tip of the protrusion 552p has a flat shape. In this case, the position of the bright point of discharge cannot be easily stabilized at the tip of the protrusion 552p.

Even in the state where the protrusion 552p is flattened, the temperature of the first electrode 92 is high during the period when the high-power mode is executed, that is, during the second launching period PH12. Therefore, the position of the bright point of discharge can be easily stabilized.

However, if the stationary lighting mode is executed in the state where the protrusion 552p remains flattened, the temperature of the first electrode 92 falls and the position of the bright point of discharge becomes unstable, causing the discharge lamp 90 to flicker in some cases.

To cope with this problem, according to this embodiment, the protrusion forming mode to facilitate the growth of the protrusion 552p is executed after the high-power mode is executed and before the stationary lighting mode is executed. Therefore, as shown in FIG. 20C, the protrusion 552p melted in the high-power mode grows in the protrusion forming mode and has a shape with a pointed tip. Thus, the execution of the stationary lighting mode in the state where the protrusion 552p is flattened can be restrained and the flickering of the discharge lamp 90 can be restrained.

Also, according to this embodiment, since the proportion of the AC periods P1a, P2a with a frequency of, for example, 100 Hz or above and 1000 Hz or below, is set to be high with respect to the protrusion forming period PH4, the growth of the protrusion 552p can be facilitated in the protrusion forming period PH4.

If the driving to facilitate the formation of the protrusion 552p continues to be executed, there is a problem that the protrusion 552p gradually becomes thinner, increasing the distance between the electrodes.

In contrast, according to this embodiment, the proportion of the AC periods P1a, P2a to the protrusion forming period PH4 is set to be higher than the proportion of the AC periods P1a, P2a to the second launching period PH12 and the proportion of the AC periods P1a, P2a to the stationary lighting period PH2. Therefore, the degree of growth of the protrusion 552p in the second launching period PH12 and the stationary lighting period PH2 can be made lower than the degree of growth of the protrusion 552p in the protrusion forming period PH4. Thus, according to this embodiment, the increase in the distance between the electrodes due to the thinning of the protrusion 552p can be restrained.

Also, according to this embodiment, the protrusion forming power Wm in the protrusion forming period PH4 (protrusion forming mode) is set between the refresh power Wr in the second launching period PH12 (high-power mode) and the stationary lighting power Ws in the stationary lighting period PH2 (stationary lighting mode). Therefore, the drive power W decreases stepwise in the order of the second launching period PH12, the protrusion forming period PH4, and the stationary lighting period PH2. Consequently, sudden change in the drive power W is restrained and the load applied to the first electrode 92 of the discharge lamp 90 can be reduced.

In the embodiment, the following configuration may also be employed.

In the embodiment, the drive current waveform may be set as the second execution information of the protrusion forming mode. Specifically, for example, the proportion of the AC periods P1a, P2a to the protrusion forming period PH4 may be set as the second execution information of the protrusion forming mode. A specific example of a lookup table in this embodiment is shown in Table 12.

TABLE 12

| Proportion of AC Periods to Protrusion Forming Period (%) | | Drive Refresh Effect | | |
|---|---|---|---|---|
| | | High | Medium | Low |
| Refresh Power Wr (W) | 141 to 169 | 90 | 85 | 80 |
| | 170 to 189 | 95 | 90 | 85 |
| | 190 to 200 | 100 | 95 | 90 |

In Table 12, the drive refresh effect is expressed in three stages of high, medium, and low, as in Table 11.

As shown in Table 12, the proportion of the AC periods P1a, P2a to the protrusion forming period PH4 is set to be higher as the drive refresh effect is higher and as the refresh power Wr is higher. Thus, the protrusion 552p can be allowed to grow sufficiently in the protrusion forming period PH4. Here, the proportion of the AC periods P1a, P2a being 100% means that the DC periods P1b, P2b are not provided.

In the above description, the protrusion forming power Wm is set between the refresh power Wr and the stationary lighting power Ws. However, this example is not limiting. In the embodiment, the protrusion forming power Wm may be the same as the refresh power Wr or may be the same as the stationary lighting power Ws. The growth of the protrusion 552p can be facilitated more as the protrusion forming power Wm is set to be higher.

Also, in the embodiment, the drive power W may be changed when the protrusion forming mode is executed.

Figure 21:
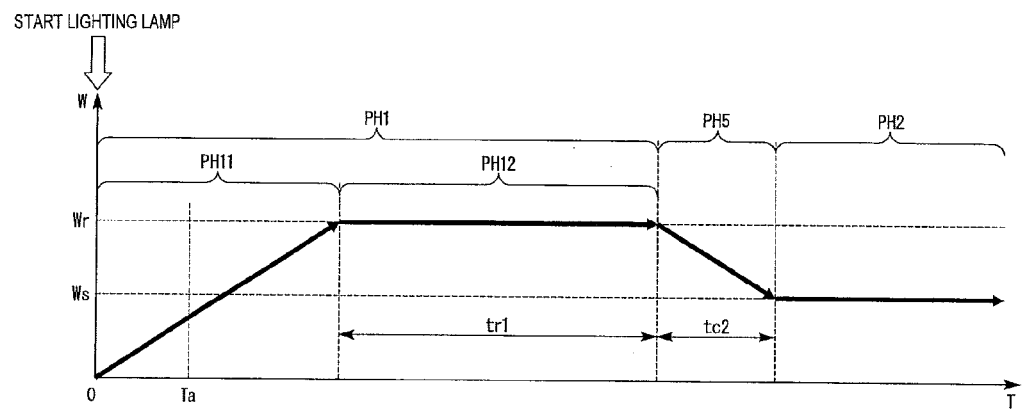
FIG. 21 shows another example of a drive power waveform according to the seventh embodiment.

FIG. 21 shows an example of a drive power waveform in this embodiment. In FIG. 21, the vertical axis represents drive power W and the horizontal axis represents time T. FIG. 21 shows, as in FIG. 18, change in the drive power W from the time point when the discharge lamp 90 is lit to when the stationary lighting state is reached.

As shown in FIG. 21, in a protrusion forming period pH5, the drive power W changes continuously from the refresh power Wr toward the stationary lighting power Ws. In the example shown in FIG. 21, the drive power W in the protrusion forming period PH5 changes linearly.

The length of the protrusion forming period PH5, that is, an execution time tc2 of the protrusion forming mode is set similarly to the protrusion forming period PH4.

According to this configuration, since the drive power W gradually falls from the refresh power Wr toward the stationary lighting power Ws in the protrusion forming period PH5, sudden change in the drive power W is restrained and the load applied to the first electrode 92 of the discharge lamp 90 can be reduced further. Also, since the intensity of the light emitted from the discharge lamp 90 gradually falls with the fall in the drive power W, flickering of the discharge lamp 90 can be restrained when the mode is switched to the stationary lighting mode.

The change in the drive power W in the protrusion forming period PH5 is not limited to linear change and may be any continuous change. In this embodiment, for example, the drive power W in the protrusion forming period PH5 may change in a curvilinear manner.

Also, in the embodiment, the change in the drive power W in the protrusion forming period PH5 is not limited to continuous change over the entire protrusion forming period PH5. The drive power W may change continuously toward the stationary lighting power Ws in a certain period in the protrusion forming period PH5. For example, the drive power W in the protrusion forming period PH5 may continuously change toward the stationary lighting power Ws in a certain period in the protrusion forming period PH5 and may be maintained in the other periods.

Also, in the embodiment, the control unit 40 may decide whether to keep constant or change the drive power W supplied to the discharge lamp 90 in the protrusion forming period PH4, for example, on the basis of the first information such as the refresh power Wr in the high-power mode.

Moreover, in the embodiment, the frequency of the alternating current included in the drive current I in the high-power mode and the stationary lighting mode may be set to a frequency that is lower than 100 Hz or higher than 1000 Hz. That is, in the embodiment, the frequency of the alternating current included in the drive current I in the high-power mode and the stationary lighting mode may not be set to the frequency that facilitates the growth of the protrusion 552p.

In the embodiment, the frequency of the AC periods P1a, P2a may change by each mixture period P1, P2.

In the above description, for example, the proportion of the time when an alternating current of 100 Hz or above and 1000 Hz or below is supplied to the discharge lamp 90 is made high with respect to the protrusion forming period PH4, in order to facilitate the growth of the protrusion 552p in the protrusion forming mode. However, this example is not limiting. In the embodiment, the protrusion forming mode is not limited as long as the degree of growth of the protrusion 552p in the protrusion forming mode is higher than the degree of growth of the protrusion 552p in the high-power mode and the stationary lighting mode. In the embodiment, for example, the protrusion forming mode may employ driving in which the drive current I supplied to the discharge lamp 90 is higher than in the high-power mode and the stationary lighting mode.

In the above description, the setting of the second execution information of the protrusion forming mode (Step S71) is provided before the execution of the high-power mode (Step S72). However, this example is not limiting. In the embodiment, the setting of the second execution information of the protrusion forming mode may be carried out at any time before the lighting period shifts to the protrusion forming period PH4 (Step S73).

Eighth Embodiment

An eighth embodiment is different from the seventh embodiment in that the second execution information of the protrusion forming mode is set on the basis of deterioration information of the discharge lamp 90.

In the description below, the similar configurations to those of the foregoing embodiments may be denoted by the same reference numerals as needed and not described further in detail.

Figure 22:
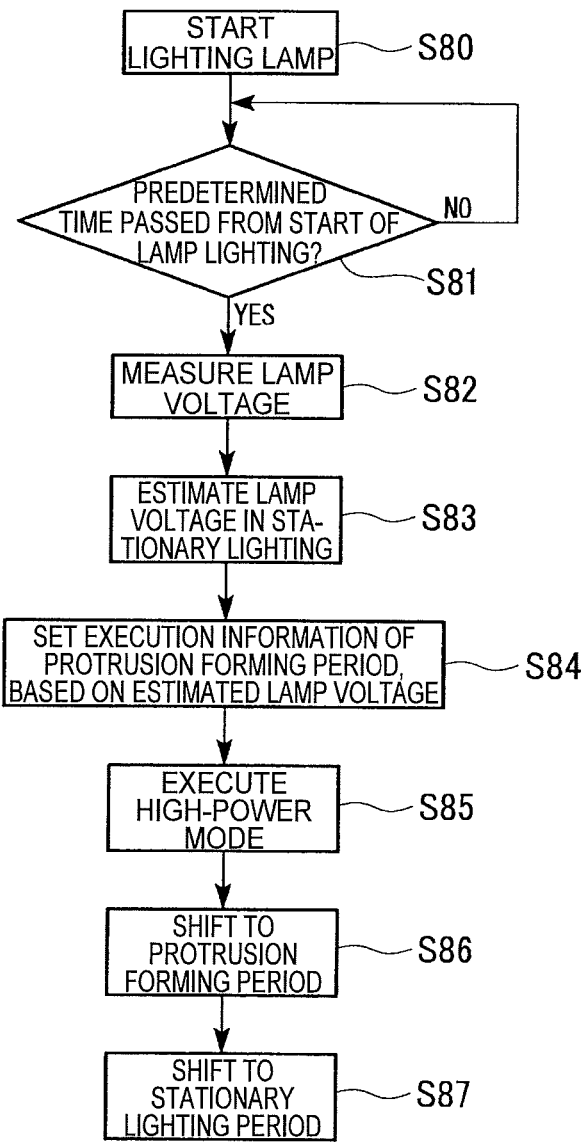
FIG. 22 is a flowchart showing an example of a control procedure for a discharge lamp driving unit by a control unit of an eighth embodiment.

FIG. 22 is a flowchart showing an example of the control procedure for the discharge lamp driving unit 230 by the control unit 40 in this embodiment.

As shown in FIG. 22, the lighting of the discharge lamp 90 is started (Step S80), and the control unit 40 determines whether a predetermined time has passed from the start of the lighting of the lamp or not (Step S81). The predetermined time is the time from the start of the lighting of the lamp to when the lamp voltage is referred to, that is, to time Ta in FIG. 18. The value of the time Ta is stored, for example, in the storage unit 44 in advance.

If the predetermined time has passed from the start of the lighting of the lamp (Step S81: YES), the control unit 40 detects the lamp voltage (deterioration information), for example, at the time Ta (Step S82). Here, as described in the first embodiment, since the lamp voltage referred to at the time Ta is different from the lamp voltage in the stationary lighting period PH2, the designer of the projector prepares, in advance, a conversion formula to find the lamp voltage in the stationary lighting period PH2 from the lamp voltage value at the time Ta, or a conversion table based on statistical values of voltage transition that are actually measured with plural discharge lamps, and stores the conversion formula or conversion table in the storage unit 44 in advance. As such conversion tables, for example, the conversion tables shown in Tables 2 and 5 may be employed.

The control unit 40 estimates the lamp voltage in the stationary lighting period PH2 on the basis of the conversion table (Step S83). The control unit 40 then sets second execution information of the protrusion forming mode on the basis of the estimated lamp voltage (Step S84). The second execution information of the protrusion forming mode is set, for example, using a lookup table showing the relation between the estimated lamp voltage in the stationary lighting period PH2 and the second execution information of the protrusion forming mode. In this embodiment, for example, the execution time tc1 is set as the second execution information of the protrusion forming mode. A specific example of the lookup table in this embodiment is shown in Table 13.

TABLE 13

| Lamp Voltage (V) in Stationary Lighting Period | Length of Protrusion Forming Period (s) |
|---|---|
| To 70 | 10 |
| 71 to 80 | 15 |
| 81 to 90 | 20 |
| 91 and above | 25 |

As shown in Table 13, the execution time tc1 of the protrusion forming mode is set to be longer as the estimated lamp voltage in the stationary lighting period PH2 increases. This is because the protrusion 552p can grow less easily as the lamp voltage in the stationary lighting period PH2 increases, that is, as the degree of deterioration of the discharge lamp 90 becomes higher.

The control unit 40 executes the high-power mode (Step S85), as in the seventh embodiment, and subsequently shifts the lighting period to the protrusion forming period PH4 (Step S86). After the lapse of the execution time tc1 of the protrusion forming period PH4, the control unit 40 shifts the lighting period to the stationary lighting period PH2 (Step S87).

According to this embodiment, flickering of the discharge lamp 90 can be restrained, as in the seventh embodiment.

Also, according to this embodiment, since the second execution information of the protrusion forming mode is set on the basis of the deterioration information of the discharge lamp 90, the protrusion forming mode can be executed properly according to the deterioration state of the discharge lamp 90.

In the embodiment, the following configuration may also be employed.

While the lamp voltage of the discharge lamp 90 is used as the deterioration information of the discharge lamp 90 in the above description, this example is not limiting. In the embodiment, for example, the cumulative lighting time of the discharge lamp 90 may be used as the deterioration information of the discharge lamp 90.

Also, while the timing of acquiring the deterioration information of the discharge lamp 90 is the time Ta in the above description, this example is not limiting. The timing of acquiring the deterioration information of the discharge lamp 90 is not particularly limited as long as the timing is before the protrusion forming period PH4. Specifically, for example, the timing may be in the second launching period PH12, in which the high-power mode is executed. Alternatively, for example, the lamp voltage may be acquired immediately before power is turned off, and the acquired lamp voltage may be stored in the storage unit 44.

In the seventh and eighth embodiments, the high-power mode is executed in the launching period PH1. However, this example is not limiting. The high-power mode may be executed in the stationary lighting period PH2, for example, as described in the sixth embodiment.

The technical scope of the invention is not limited to the above embodiments. Various changes can be made without departing from the spirit and scope of the invention.

The first to eighth embodiments can be suitably combined without interfering with each other.

The entire disclosure of Japanese Patent Application No.: 2013-213472, filed Oct. 11, 2013, No.: 2014-045994, filed Mar. 10, 2014, No.: 2014-047298, filed Mar. 11, 2014 and No.: 2014-150863, filed Jul. 24, 2014 are expressly incorporated by reference herein.

What is claimed is:

1. A discharge lamp driving device comprising:
    a discharge lamp driving unit which supplies drive power to a discharge lamp having electrodes;
    a storage unit which stores information with respect to the discharge lamp; and
    a control unit which controls the discharge lamp driving unit,
    wherein the control unit is configured to execute a stationary lighting driving in which a first drive power is supplied to the discharge lamp and a high-power driving in which a second drive power that is higher than the first drive power is supplied to the discharge lamp, and
    the control unit sets first execution information of the high-power driving on the basis of a first information with respect to the high-power driving stored in the storage unit, at a predetermined setting timing, and controls the discharge lamp driving unit according to the first execution information.

2. The discharge lamp driving device according to claim 1, wherein the first information includes a lighting time of the discharge lamp within a period from an end of previous high-power driving to the setting timing.

3. The discharge lamp driving device according to claim 1, wherein the first information includes an inter-electrode voltage of the discharge lamp detected at the time of the high-power driving.

4. The discharge lamp driving device according to claim 1, wherein the first information includes a value of the second drive power supplied to the discharge lamp at the time of the high-power driving.

5. The discharge lamp driving device according to claim 1, wherein the first information includes a waveform of a drive current in the high-power driving.

6. The discharge lamp driving device according to claim 1, wherein the control unit sets the first execution information on the basis of at least one of an inter-electrode voltage of the discharge lamp detected at the setting timing and a cumulative lighting time of the discharge lamp at the setting timing.

7. The discharge lamp driving device according to claim 1, wherein the control unit sets the first execution information on the basis of at least one of a value of the drive power supplied to the discharge lamp within a period from an end of previous high-power driving to the setting timing, and an inter-electrode voltage of the discharge lamp at the time of previous lighting of the discharge lamp.

8. The discharge lamp driving device according to claim 1, wherein the first execution information includes a restraining time in which execution of the high-power driving is restrained.

9. The discharge lamp driving device according to claim 1, wherein the first execution information includes whether to execute the high-power driving or not.

10. The discharge lamp driving device according to claim 1, wherein the first execution information includes at least one of a value of the second drive power in the high-power driving, a waveform of a drive current supplied to the discharge lamp in the high-power driving, and an execution time of the high-power driving.

11. The discharge lamp driving device according to claim 1, wherein a launching period from a start of lighting of the discharge lamp to a shift to a stationary lighting period in which the stationary lighting driving is carried out includes a first launching period in which the drive power increases toward the second drive power and a second launching period in which the drive power is maintained at a value of the second drive power, and
    the control unit controls the discharge lamp driving unit to execute the high-power driving in the second launching period.

12. The discharge lamp driving device according to claim 1, wherein the control unit controls the discharge lamp driving unit to execute the high-power driving in a stationary lighting period in which the stationary lighting driving is carried out.

13. The discharge lamp driving device according to claim 1, wherein the control unit is configured to execute a protrusion forming driving to facilitate growth of protrusions formed at distal ends of the electrodes, and
    the control unit executes the protrusion forming driving after executing the high-power driving and before executing the stationary lighting driving.

14. The discharge lamp driving device according to claim 13, wherein a drive current in the protrusion forming driving includes a first alternating current having a frequency equal to or higher than 100 Hz and equal to or lower than 1000 Hz,
    a drive current in the high-power driving includes a second alternating current having a frequency equal to or higher than 100 Hz and equal to or lower than 1000 Hz, and
    a proportion of a time when the first alternating current is supplied to an execution time of the protrusion forming driving is higher than a proportion of a time when the second alternating current is supplied to an execution time of the high-power driving.

15. The discharge lamp driving device according to claim 13, wherein a drive current in the protrusion forming driving includes a first alternating current having a frequency equal to or higher than 100 Hz and equal to or lower than 1000 Hz,
   a drive current in the stationary lighting driving includes a third alternating current having a frequency equal to or higher than 100 Hz and equal to or lower than 1000 Hz, and
   a proportion of a time when the first alternating current is supplied to an execution time of the protrusion forming driving is higher than a proportion of a time when the third alternating current is supplied to an execution time of the stationary lighting driving.

16. The discharge lamp driving device according to claim 13, wherein the control unit controls the discharge lamp driving unit such that third drive power that is higher than the first drive power and lower than the second drive power is supplied to the discharge lamp in the protrusion forming driving.

17. The discharge lamp driving device according to claim 13, wherein the control unit sets second execution information of the protrusion forming driving on the basis of at least one of a waveform of a drive current in the high-power driving and a value of the second drive power.

18. The discharge lamp driving device according to claim 13, wherein the control unit sets second execution information of the protrusion forming driving on the basis of deterioration information of the discharge lamp.

19. A projector comprising:
   a discharge lamp which emits light;
   the discharge lamp driving device according to claim 1;
   a light modulation element which modulates light emitted from the discharge lamp according to a video signal; and
   a projection system which projects the light modulated by the light modulation element.

20. A discharge lamp driving method comprising driving a discharge lamp in a stationary lighting driving in which a first drive power is supplied to the discharge lamp having electrodes and a high-power driving in which a second drive power that is higher than the first drive power is supplied to the discharge lamp, and
   setting a first execution information of the high-power driving on the basis of a first information with respect to the high-power driving, at a predetermined timing.

* * * * *